(12) United States Patent
Stewart et al.

(10) Patent No.: US 7,360,784 B2
(45) Date of Patent: Apr. 22, 2008

(54) MULTIFUNCTIONAL MOBILE STORAGE AND DELIVERY SYSTEM

(75) Inventors: Ricky William Stewart, Mukilteo, WA (US); Lee Walker Brillhart, III, Seattle, WA (US); Bradley D. Barnard, Kirkland, WA (US); Jake Levine, Seattle, WA (US); Brian Coxon, Lake Forrest Park, WA (US)

(73) Assignee: Ultimate Survival Technologies, LLC, Monroe, WA (US)

( * ) Notice: Subject to any disclaimer, the term of this patent is extended or adjusted under 35 U.S.C. 154(b) by 305 days.

(21) Appl. No.: 10/778,768

(22) Filed: Feb. 13, 2004

(65) Prior Publication Data

US 2005/0179235 A1    Aug. 18, 2005

(51) Int. Cl.
*B62D 39/00* (2006.01)
(52) U.S. Cl. .................. 280/656; 280/79.2; 280/30; 280/47.18; 220/4.16; 220/6
(58) Field of Classification Search ........... 280/47.131, 280/6.153, 655.1, 79.11, 47.16, 47.2, 47.18, 280/79.2, 639, 656, 763.1, 30, 767, 764.1, 280/765.1, 766.1; 220/4.16, 4.28, 6, 7
See application file for complete search history.

(56) References Cited

U.S. PATENT DOCUMENTS

| | | | | | |
|---|---|---|---|---|---|
| 1,443,594 | A | * | 1/1923 | Saives ........................ 414/499 |
| 2,002,455 | A | * | 5/1935 | Schwerin ................. 280/43.14 |
| 2,591,153 | A | * | 4/1952 | Hodges ....................... 414/499 |
| 2,956,699 | A | * | 10/1960 | Payne .......................... 254/45 |
| 3,057,636 | A | * | 10/1962 | D Ettorre et al. ............. 280/37 |
| 3,140,005 | A | * | 7/1964 | Hand .......................... 220/1.5 |
| 3,207,527 | A | * | 9/1965 | Sundberg ........................ 52/69 |
| 3,488,062 | A | * | 1/1970 | Fedde .......................... 280/43 |
| 3,734,525 | A | * | 5/1973 | Rimbey ........................ 280/30 |
| 3,865,392 | A | * | 2/1975 | Hartway ....................... 280/35 |
| 4,230,340 | A | * | 10/1980 | Wasservogel ............... 280/656 |
| 4,266,796 | A | * | 5/1981 | Riggs et al. ............. 280/414.1 |
| 4,364,148 | A | * | 12/1982 | McVicker ...................... 16/32 |
| 4,927,026 | A | * | 5/1990 | Gossler et al. ............. 206/600 |
| 5,137,297 | A | * | 8/1992 | Walker ..................... 280/414.5 |
| 5,269,414 | A | * | 12/1993 | D'Hollander ............... 206/600 |
| 5,289,933 | A | * | 3/1994 | Streich et al. ............... 220/1.5 |
| 5,310,209 | A | * | 5/1994 | Holman ...................... 280/656 |
| 5,586,775 | A | * | 12/1996 | Cheng .......................... 280/38 |
| 5,806,863 | A | * | 9/1998 | Heger et al. ........... 280/33.998 |
| 5,862,931 | A | * | 1/1999 | Cox et al. ....................... 220/6 |
| 5,957,322 | A | * | 9/1999 | Pugh ..................... 220/560.03 |
| 6,746,040 | B2 | * | 6/2004 | Bordeleau et al. .......... 280/656 |
| 6,902,061 | B1 | * | 6/2005 | Elstone ....................... 206/600 |
| 2003/0102309 | A1 | * | 6/2003 | Hartwall ......................... 220/6 |
| 2003/0184055 | A1 | * | 10/2003 | Badger et al. .............. 280/656 |

\* cited by examiner

*Primary Examiner*—Christopher P. Ellis
*Assistant Examiner*—Vaughn Coolman
(74) *Attorney, Agent, or Firm*—Charles J. Rupnick

(57) ABSTRACT

A reconfigurable, transportable container assembly is provided. Side panels are releasably interconnected with each other and combine with a base panel, and a top panel releasably mates with the side panels. The top panel is combined with the side panels and the base panel to form a transport configuration that defines a closed, transportable, collapsible container, and that is reconfigurable to a non-transport configuration that defines a substantially stationary structure different from the transport configuration. Embodiments can include deployable wheel assemblies and extendible jack assemblies connect to the base panel.

49 Claims, 14 Drawing Sheets

MULTIFUNCTIONAL MOBILE STORAGE AND DELIVERY SYSTEM

TECHNICAL FIELD

The present invention relates to storage and delivery devices, and more particularly to reconfigurable mobile transport containers with multiple functionalities.

BACKGROUND

Equipment, products, and other cargo are typically packed in a variety of containers and container systems for transportation via plane, ship, or land vehicle. Conventional transport container assemblies and systems are often specifically designed for certain transportation modes that have limitations when other transportation modes are needed. As an example, large, sturdy transport containers can be used for cargo transported via planes or ships, but such containers may not be effective for transportation by land vehicles or by manual transportation. Other container assemblies are too small for efficient transportation of large amounts of cargo. In addition, transport containers can efficiently transport cargo when fully loaded, but after the containers are empty and not in use, they require substantial storage space. Storage space may not be readily available, may be economically inefficient, or may even be cost-prohibitive.

Many container assemblies are designed for very effective and efficient cargo transportation, but the containers have limited versatility beyond carrying cargo. As an example, the transport container assemblies and cargo systems used in military environments must meet specific weight and size characteristics suitable for transportation to selected destinations by plane, ship, or truck. These transport containers must also be extremely durable for use over time in various and potentially harsh environments. Once the containers have reached a destination via air or sea, the transport containers often must be further moved by vehicle or even manually over land to their final destination. Once the transport container reaches the final destination and the cargo is unloaded, the transport container must either be stored or, if possible, transported back to another location for further use or storage.

It is highly desirable to use a minimum number of very versatile transport container assemblies for efficient use in a maximum number of situations. It is also highly desirable to use transport container assemblies that help maximize the efficient use of equipment, manpower, fuel, and storage space in connection with transportation of cargo to selected locations, and particularly to remote locations. Therefore, there is a need for transport container assemblies that allow for efficient transportation of cargo, while requiring minimum storage space, and that provide improved versatility for a variety of uses beyond carrying cargo.

SUMMARY

The present invention overcomes limitations of the prior art and provides additional benefits. A brief summary of some embodiments and aspects of the invention is presented. Thereafter, a detailed description of the illustrated embodiments is presented, which will permit one skilled in the relevant art to make and use aspects of the invention. One skilled in the relevant art can obtain a full appreciation of aspects of the invention from the subsequent detailed description read together with the figures, and from the claims that follow the detailed description.

Under one aspect of the invention, a reconfigurable, transportable container assembly is provided. The container assembly comprises a base panel, a plurality of side panels releasably attached to the base panel, and a top panel releasably attached to the side panels. The side panels are releasably interconnected with each other and combine with the base panel to define an internal volume when the side panels are in an upright, closed position. The side panels have first and second panel joinery, and the first panel joinery releasably mates with the joinery on the base panel. The top panel has integral top joinery that releasably mates with the second panel joinery. The top panel is combined with the side panels and the base panel to form a transport configuration that defines a closed, transportable, collapsible container, and that is reconfigurable to a nontransport configuration that defines a substantially stationary structure different from the transport configuration.

The container assembly in one embodiment has wheel assemblies attached to the base panel. The wheel assemblies are movable between a stored position and a deployed position. The wheel assemblies are configured to rollably support the transportable container assembly when in the deployed position for towing by a tow vehicle. The container assembly in one embodiment has a retractable lift assembly attached to the base panel. The lift assembly is movable relative to the base panel between a retracted position and an extended position. The lift assembly supports the base panel above a support surface (such as the ground) when in the extended position to allow for movement of the wheel assemblies between the stored and deployed positions.

Under another aspect of the invention, the side panels form a substantially fluid-tight seal with each other, with the base panel, and with the top panel when the side panels are in the upright, closed position, thereby forming a buoyant and collapsible container assembly. At least one of the side panels is movable upright, to a lowered, open position with a bottom edge of the side panel being in engagement with the base panel. The side panel in the lowered position forms a ramp for access into the internal volume of the container assembly. The container assembly also has a tow member removably attachable to the base panel. The tow member is configured to releasably attach to a tow vehicle for towing of the container assembly when the wheel assemblies are in the deployed position. The tow member is storable in at least one of the internal volume, the base panel, and the top panel.

Under another aspect of the invention, retractable lift assemblies are recessed in the base panel and are movable between a retracted position, a first extended position, and a second extended position. The lift assemblies are configured to support the base panel above a support surface when the lift assemblies are in the extended positions. The lift assemblies are also out of engagement with the support surface when in the retracted position. Each of the lift assemblies has a caster portion and a leg portion. The caster portion is positioned to movably engage the support surface when the lift assembly is extended. In one embodiment, when the lift assembly is in the second extended position, the caster portion is out of movable engagement with the support surface and the leg portion is in engagement with the support surface.

DETAILED DESCRIPTION

A reconfigurable mobile transport container assembly and a corresponding method for reconfiguring the container assembly in accordance with one or more embodiments of the present invention are described in detail herein. The following description sets forth numerous specific details, such as specific uses for the container assembly, specific materials usable for the assembly, and specific structures for use with the container assembly, to provide a thorough and enabling description for embodiments of the invention. One skilled in the relevant art, however, will recognize that the invention can be practiced without one or more of the specific details. In other instances, well-known structures or operations are not shown, or are not described in detail to avoid obscuring aspects of the invention.

Figure 1:
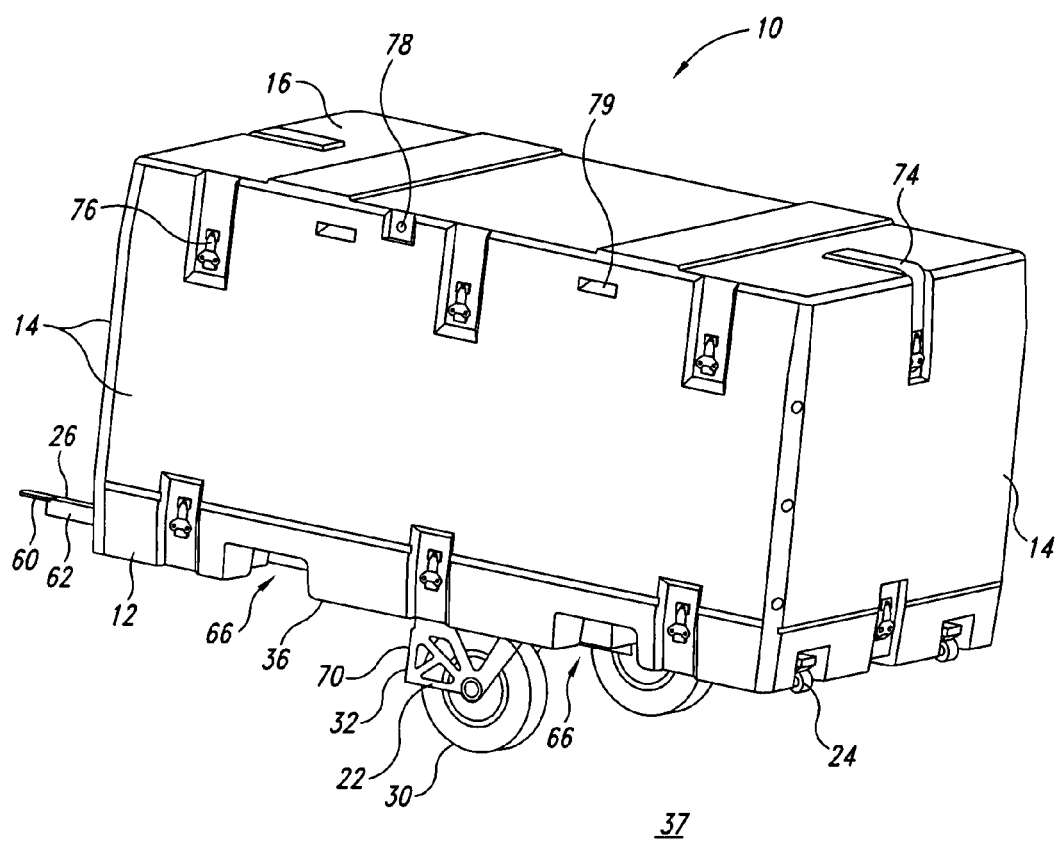
FIG. 1 is a top isometric view of a reconfigurable, collapsible container assembly in accordance with one embodiment of the present invention.

FIG. 1 is an isometric view of a reconfigurable transport container assembly 10 in accordance with an embodiment of the present invention. The container assembly 10 is a multifunctional mobile storage and delivery system that provides dependable transport and storage of cargo, while also having features that provide multifunctionality when not in use in a cargo configuration. The container assembly 10 is a towable, wheeled assembly that can be connected to a vehicle and towed on highways, streets, or off-road areas to a selected destination. The container assembly 10 provides the multifunctional uses by converting or transforming the assembly into several end-use configurations for applications other than as a storage or transport box. The container assembly 10 is also collapsible to a fraction of its fully extended size to allow for efficient use of space when the container assembly is stored or otherwise not in use.

In the illustrated embodiment, the container assembly 10 includes a base panel 12, a plurality of side panels 14 releasably connected to the base panel, and a top panel 16 removably connected to the side panels. The base panel 12, side panels 14 and top panel 16 are made of a very durable, molded material that is thermally insulative, impact-resistant, fuel-resistant, UV-resistant, and also resistant to rust, mildew, and dry rot. In one embodiment, the base, side, and top panels 12, 14, and 16 are made of Pro Wall material from Integrated Technologies, Inc. of Bothell, Wash., although other materials could be used. The base panel 12, side panels 14, and top panel 16 are illustrated in FIG. 1 in a collapsible cargo configuration that defines a transport box. In this configuration, the container assembly 10 is approximately 48 inches high (4 feet), 52 inches deep (4 feet, 4 inches), and 96 inches long (8 feet), and provides an internal volume 18 with approximately 108 cubic feet of storage. The illustrated container assembly 10 can be reconfigured into a collapsed configuration having a height of only 16 inches. Accordingly, multiple collapsed container assemblies 10 can be stacked upon each other in the same volume as one container assembly in the cargo configuration. The dimensions and sizes of the transport container assembly 10 discussed above are for illustrative purposes, and alternate embodiments of the transport container assembly can have other dimensions, as discussed in greater detail below.

Figure 2:
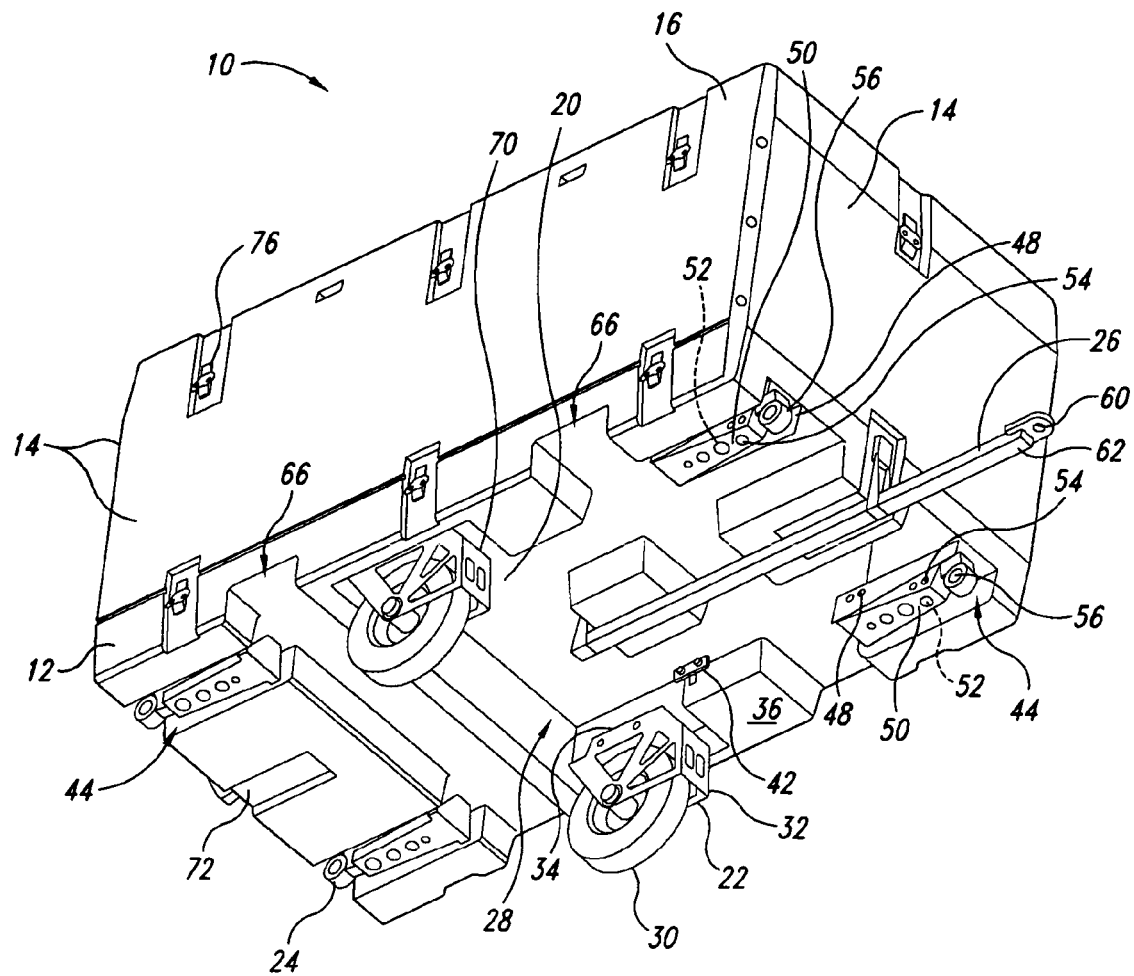
FIG. 2 is a bottom isometric view of the container assembly of FIG. 1 with wheel assemblies deployed and a tow bar in a towing configuration.
Figure 3:
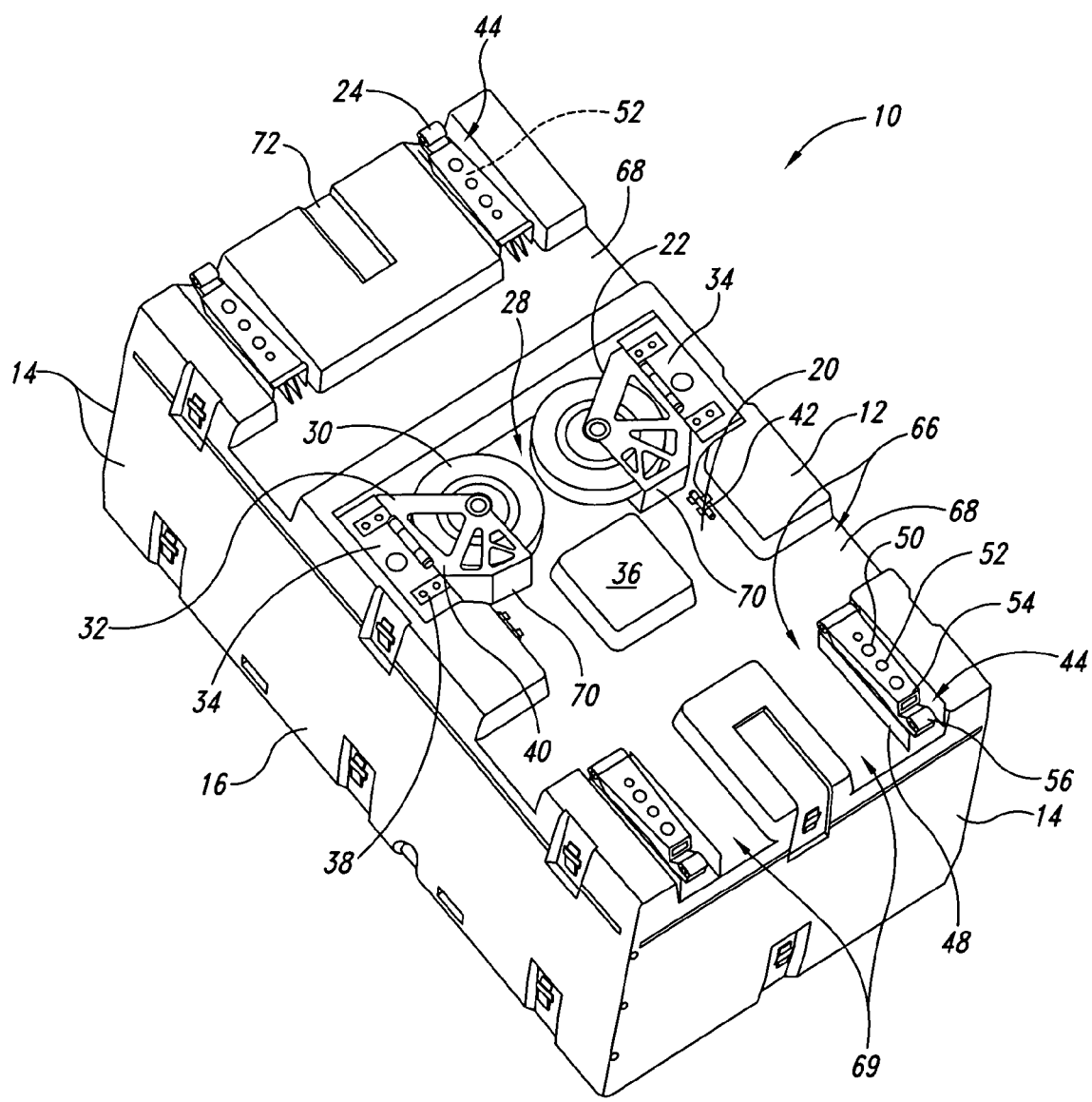
FIG. 3 is a bottom isometric view of the container assembly of FIG. 1 with a pair of wheel assemblies in a stored position and a plurality of lift assemblies in a retracted position and the tow bar removed.

As best seen in FIGS. 2 and 3, the base panel 12 has a plurality of recesses 20 that contain two retractable wheel assemblies 22 and four retractable jack assemblies 24. The wheel assemblies 22 are movable between a stored position shown in FIG. 3 and a fully deployed position shown in FIG.

2. In the stored position, the wheel assemblies 22 are substantially fully contained in one of the recesses that defines an enlarged wheel well 28 formed in the middle portion of the base panel 12. Accordingly, all of the components of the wheel assemblies 22 are contained above a bottom surface 36 of the base panel 12 so the bottom surface can rest directly on the ground or other support surface without interference by the wheel assemblies.

In the illustrated embodiment, the wheel assemblies 22 are generally aligned with a center portion of the container assembly 10 to help provide a balanced assembly when loaded with cargo or when empty. The wheel assemblies 22 of the illustrated embodiment include wheels 30 suitable for use on roadways (including highways) and on off-road conditions. In one embodiment, the wheels 30 have pneumatic tires, and, in alternate embodiments, the wheels can have nonpneumatic tires sized and durable enough for travel on roadways up to selected speeds, e.g., up to 20 miles per hour.

Figure 4:
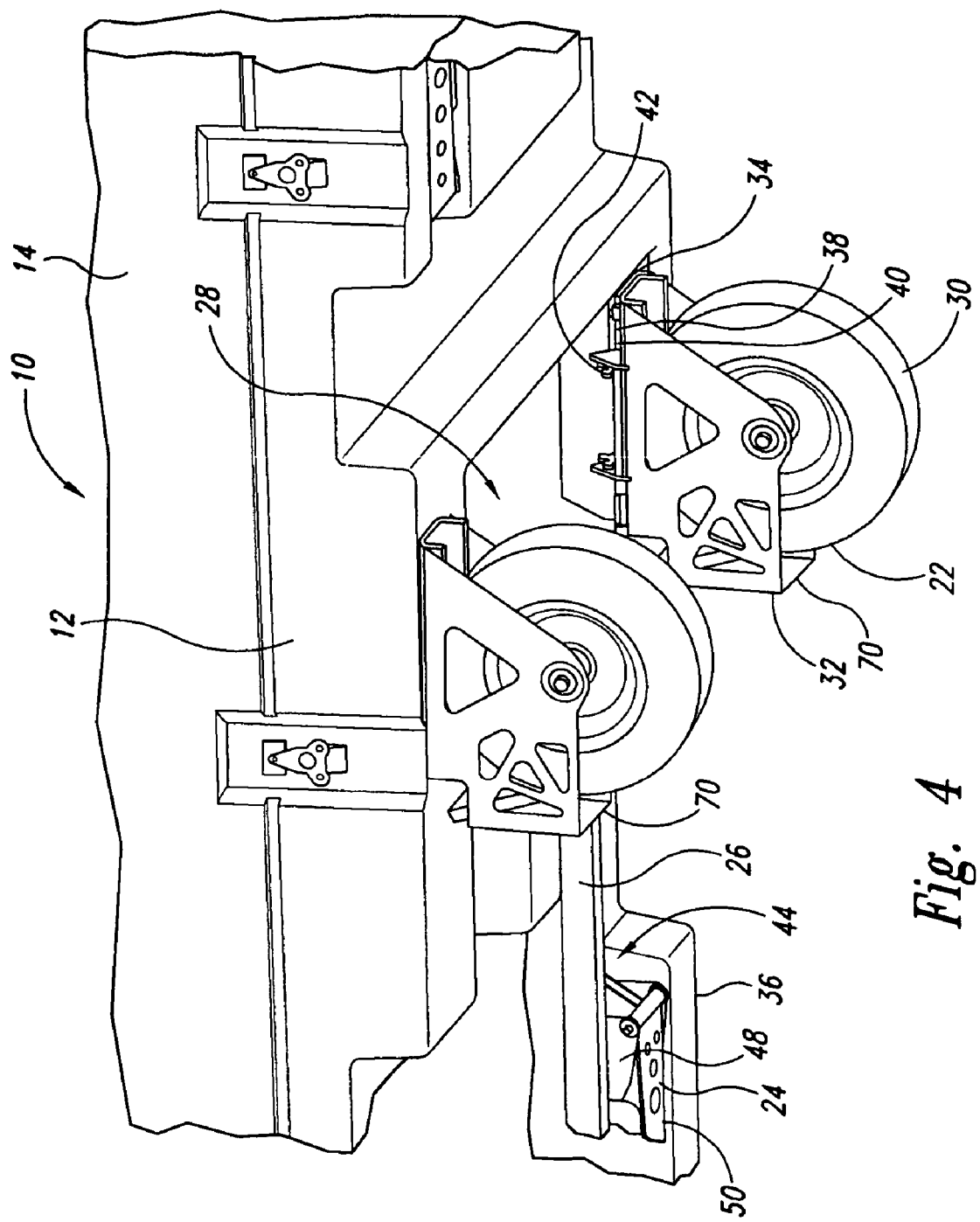
FIG. 4 is an enlarged isometric view of the wheel assemblies of FIG. 3 shown in a deployed position.

The wheels 30 are connected to wheel brackets 32 that pivotally connect to mounting brackets 34 fixed to the base panel 12. When the wheel assemblies 22 are in the deployed position (FIG. 2), the wheel brackets 32 and wheels 30 extend downwardly past the base panel's bottom surface 36 and are configured to roll along the ground or other support surface. As best seen in FIG. 4, the mounting bracket 34 has a pair of alignment rails 38 that slidably mate with channels 40 formed in the wheel brackets 32. When the wheel assemblies 22 pivot from the stored position (FIG. 3) toward the deployed position (FIG. 4), the wheel brackets 32 pivot about an inner edge of the mounting bracket 34 until the channels 40 align with the alignment rails 38. The wheel brackets 32 are then slid laterally outwardly along the alignment rails 38 to the fully deployed position.

A locking mechanism 42 is mounted on the base panel 12 adjacent to each of the mounting brackets 34 and is positioned to releasably engage the wheel bracket 32 to lock the wheel assembly 22 in the fully stored position. The locking mechanism 42 is manually releasable so a person can release the locking mechanism and move the respective wheel assembly 22 to the deployed position without requiring tools. In one embodiment, the wheel assemblies 22 can be spring-loaded or otherwise biased toward either the stored configuration or the deployed configuration. In an alternate embodiment, a locking mechanism can be provided that retains the wheel assemblies 22 in the stored position and is releasable to deploy the wheel assemblies.

Figure 5:
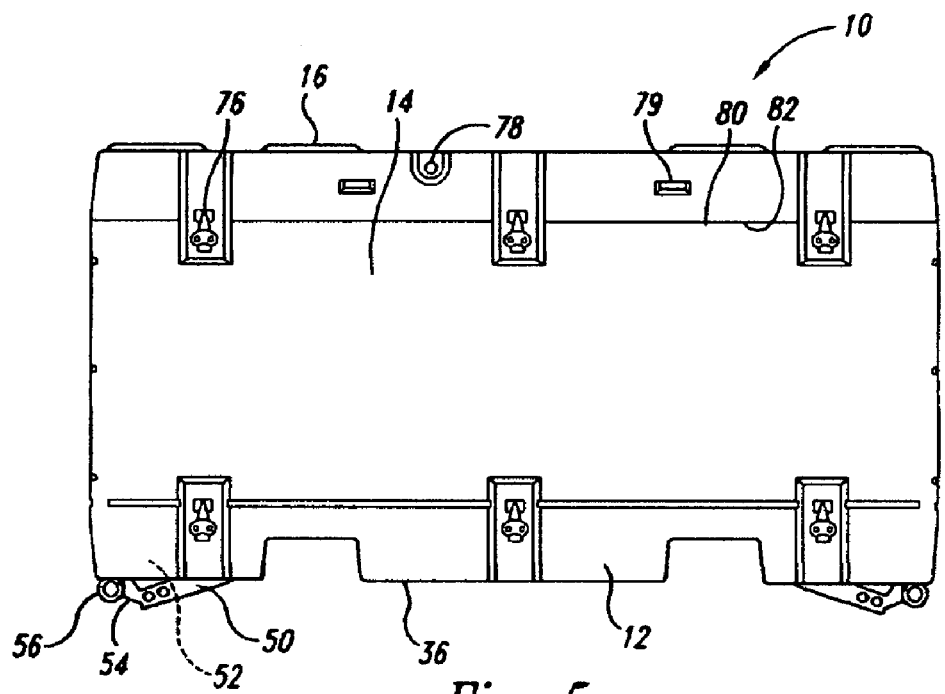
FIG. 5 is a side elevation view of the container assembly of FIG. 1 with lift assemblies shown in a first extended position and the wheel assemblies in the stored position.

Referring again to FIG. 3, the recesses 20 in the base panel 12 include four recessed corner areas 44 that contain the jack assemblies 24. The jack assemblies 24 include a mounting bracket 48 fixed to the base panel 12. A support leg 50 is pivotally connected at one end to the mounting bracket 48, and a jackscrew 52 interconnects the support leg and the mounting bracket. A caster 56 is connected to the distal end 54 of the support leg 50. The jack assemblies 24 are positionable in a retracted position so as to be fully contained in the respective recessed corner area 44. As best seen in FIG. 5, each of the jack assemblies 24 are adjustable from the retracted position to a first extended position by rotating the jackscrew 52 in the mounting bracket 48, thereby causing the support leg 50 to pivot relative to the mounting bracket. As the support leg 50 pivots, the support leg's distal end 54 and the caster 56 move past the bottom surface 36 of the base panel 12. When the jack assembly 24 is in the first extended position, the caster 56 is positioned to rollably engage the support surface although the base panel 12 is not yet far enough off of the support surface to allow the wheel assemblies 22 to be fully deployed. The four casters 56 allow the container assembly 10 to be easily rolled along the support surface.

Figure 6:
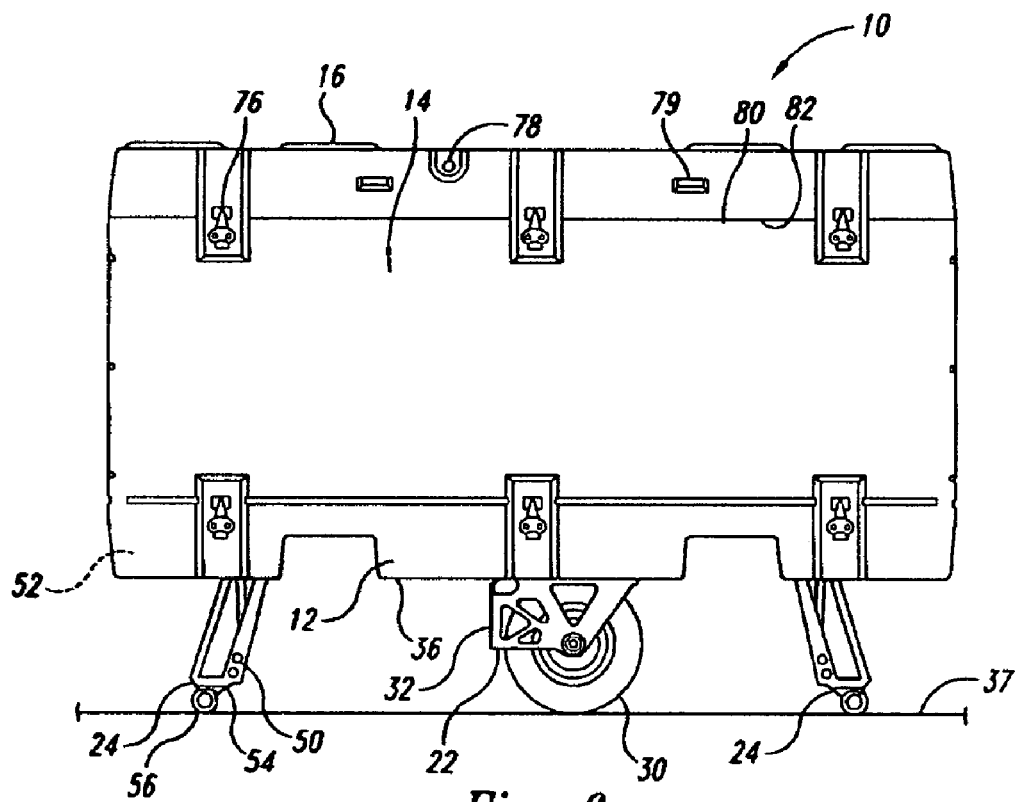
FIG. 6 is a side elevation view of the container assembly of FIG. 5 with the lift assemblies in a second extended position and the wheel assemblies in the deployed position.

As best seen in FIG. 6, when the jackscrews 52 are rotated further, the support legs 50 continue to pivot relative to the base panel 12, and the jack assembly 24 move from the first extended position to a second extended position. In this second position, the base panel 12 is supported above the support surface 37 far enough so the wheel assemblies can be easily moved between the deployed and stored positions. In one embodiment, the casters 56 remain in rolling engagement with the support surface 37 when the jack assembly 24 is in the second extended position.

In an alternate embodiment, the jack assembly 24 is configured so, as the support leg 50 is moved toward the second extended position, the caster 56 is tipped out of rolling engagement with the support surface 37. The support leg 50 supports the base panel 12 in a stable, non-rolling position above the support surface 37. Each of the casters 56 in this alternate embodiment are oriented on the support leg 50 to rollably engage the support surface 37 when the support leg is pivoted to a selected angle, as an example, approximately 15-18 degrees, relative to the bottom surface 36. As the support leg 50 pivots from this first extended position toward the second extended position, the support leg 50 pivots past the 18 degree angle and the caster 56 is pivoted out of engagement with the support surface 37. The distal end 54 of the support leg 50 moves into engagement with the support surface 37. In alternate embodiments, the casters 56 can rollably engage the support surface 37 or be out of rolling engagement with the support surface when the support legs 50 are at a different range of angles relative to the base panel 12.

In the illustrated embodiment, the jack assemblies 24 are moved between the retracted and the first and second extended positions by turning the jackscrews 52 manually or with an automated device, such as a power drill or the like. In alternate embodiments, other lifting devices, such as scissor jack assemblies, pneumatic jack assemblies, or the like can be used. After the jack assemblies 24 are moved to the second extended position, and the wheel assemblies 22 have been deployed and locked in position, the jack assemblies 24 can then be returned to the stored position, so the wheel assemblies fully support the weight of the container assembly 10.

In one embodiment, the jack assemblies 24 include hydraulic jacks connected to a hydraulic system. The hydraulic system includes a pump that can be activated to move the jack assemblies 24 between the retracted position, the first extended position and the second extended position. The hydraulic system can be configured to move each of the jack assemblies 24 separately, or to move two or more jack assemblies simultaneously. Accordingly, the hydraulic system can be configured to move all of the jack assemblies 24 simultaneously, thereby smoothly lifting or lowering the container assembly 10 relative to the ground or other support surface. In another embodiment, the jack assemblies 24 are connected to an activation system having a series of cables or the like configured to move the jack assemblies between the retracted position, the first extended position and the second extended position. The activation system can be configured to move each jack assembly 24 separately, or to move two or more of the jack assemblies simultaneously. In one embodiment, the activation system is configured to move all of the jack assemblies simultaneously.

As best seen in FIGS. 1 and 2, a tow bar 26 can be removably attached at one end to the base panel 12. The tow bar 26 includes an eyelet 60 at its free distal end 62 for removably connecting to a pintle hook or other connector on a tow vehicle. The tow bar 26 can also be connected to a handle mechanism or the like that allows the container assembly 10 to be manually rolled to a selected location. In the illustrated embodiment, the tow bar 26 is sized to be stored in the container assembly 10. The tow bar 26 is stored in a receptacle molded into the top panel 16. Other embodiments can be provided that have a base panel 12 with a molded receptacle sized to retain the tow bar 26 so the tow bar always remains with the base panel. In other embodiments, the tow bar 26 can be stowed in the internal volume 18 of the container assembly 10. In one embodiment, the tow bar 26 is a telescoping tow bar, and storage areas are provided for the tow bar when in a collapsed position.

In one embodiment, the tow bar 26 is positioned to extend from one end of the base panel 12, and the other end of the base panel includes a trailering attachment. The trailering attachment works as a coupler to connect to the tow bar of another container assembly. Accordingly, multiple container assemblies 10 can be interconnected to form a mobile train of containers.

Referring again to FIG. 3, the base panel 12 includes a plurality of molded elongated channels 66 shaped and sized to receive the tines of a forklift or other lifting mechanism (not shown). In the illustrated embodiment, the base panel 12 has one pair of molded lateral channels 68 that allow the forklift tines to extend under the base panel 12 from the broad side of the container assembly 10. The base panel 12 also has a pair of longitudinal channels 69 such that the forklift tines can extend under the base panel 12 from the end of the container assembly 10. The jack assemblies 24 and the wheel assemblies 22 are positioned so they do not interfere with the insertion or retraction of the forklift tines. In the illustrated embodiment, the longitudinal channels 69 terminate adjacent to the wheel assemblies 22 when in the stored position. The wheel bracket 32 of each wheel assembly 22 includes a protective end wall 70 positioned at an end portion of the longitudinal channels 69. The end walls 70 protect the wheels 30 and prevent the forklift tines from engaging and potentially damaging the tires.

Figure 7A:
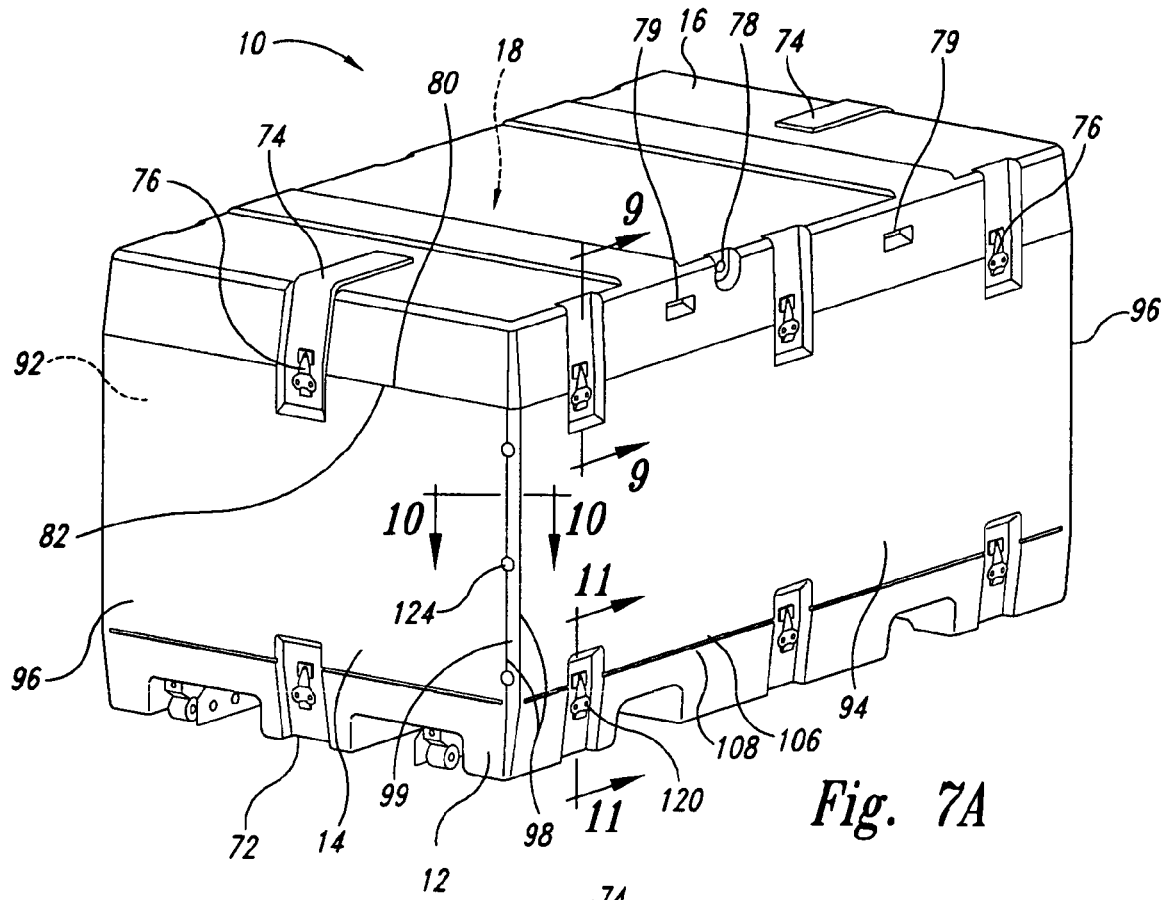
FIG. 7A is an isometric view of the container assembly of FIG. 1 in a closed, sealed cargo configuration.
Figure 7B:
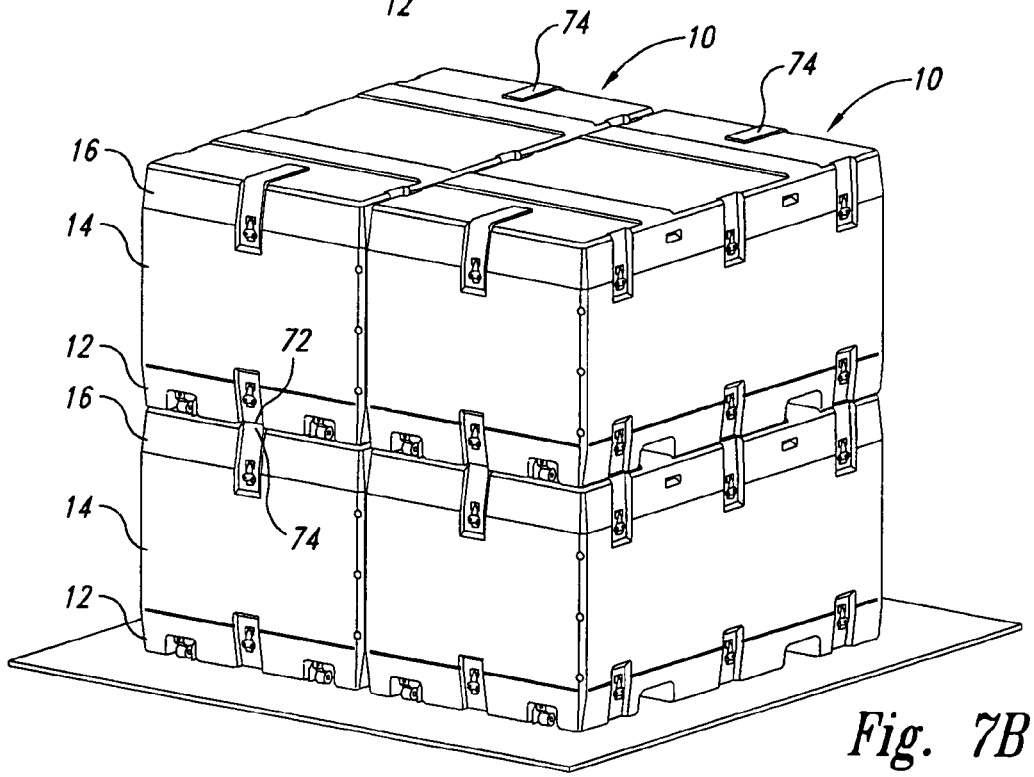
FIG. 7B is an isometric view of four container assemblies of FIG. 7A shown stacked and positioned on a conventional pallet.

FIG. 7A is an isometric view of the container assembly 10 shown in a closed, sealed cargo configuration. FIG. 7B is an isometric view of four container assemblies 10 shown stacked on a conventional pallet. The base panel 12 of each container assembly 10 has a plurality of recessed aligning areas 72 molded into the bottom surface 36. The top panel 16 also has a plurality of alignment projections 74 aligned to nest with the recessed aligning areas 72 in the base panel of the top container assembly 10. The alignment projections 74 and recessed aligning areas 72 align the stacked container assemblies 10 so that the corresponding side panels 14 are substantially vertically aligned for maximum strength in the stack. In one embodiment, the container assemblies 10 are constructed in a manner allowing them to be stacked at least three high when each container assembly contains up to approximately 2500 lbs. Other embodiments can have alignment projections 74 and recessed aligning areas 72 with different shapes and positions so as to facilitate and assist in properly aligning the container assemblies 10 when stacked.

Figure 8A:
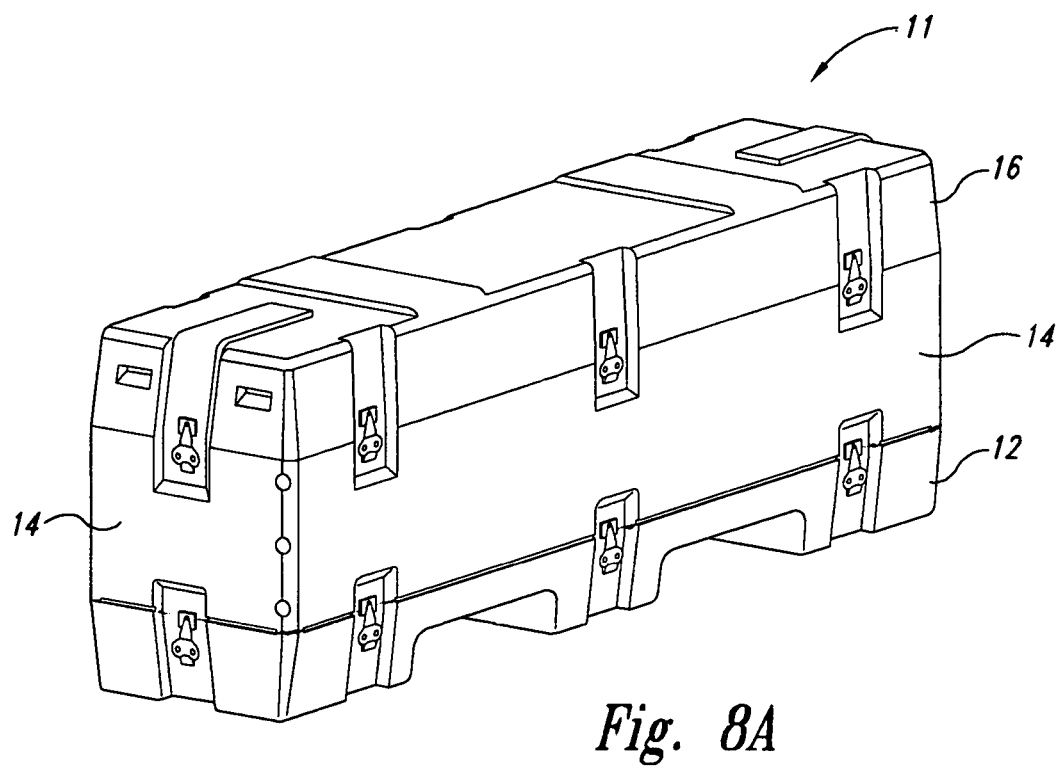
FIG. 8A is an isometric view of a narrower model of the container assembly of FIG. 7A.
Figure 8B:
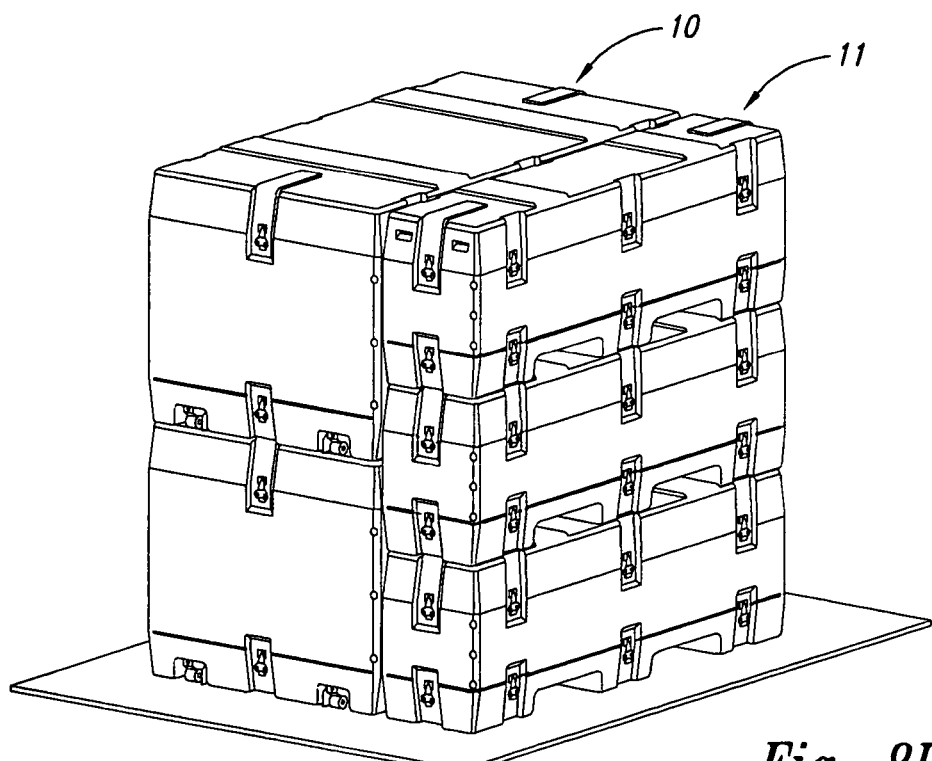
FIG. 8B is an isometric view of multiple container assemblies of FIGS. 1 and 8A shown stacked and positioned on a conventional pallet.

As best seen in FIG. 8A, the container assembly 11 in an alternate embodiment can be provided with different dimensions. The container assembly 11 of this alternate embodiment is narrower model than the standard model of the container assembly 10 shown in FIG. 7A. As best seen in FIG. 8B, this narrower model of the container assembly 11 can be stacked together and/or with the standard model. When stacked, the top container assembly 10/11 of each model nests atop the corresponding lower container assembly. The two models of the container assemblies 10 and 11 are shaped and sized such that the container assemblies can be stacked and arranged in a cube-like configuration to fit on a standard military 463 L pallet used in standard cargo transportation in aircraft and the like. Alternate embodiments can have a plurality of only one model of the container assemblies 10 or 11 stacked together in a selected pattern, cube-like or otherwise, for selected storage until the container assemblies are to be moved, emptied, reconfigured, or the like.

Under one aspect of the invention, the container assembly 10 forms a collapsible, yet fluid-tight and buoyant container when in the cargo configuration and in the collapsed configuration. In one embodiment, the container assembly 10 is buoyant enough to float while containing up to 1000 lbs. of cargo. As best seen in FIG. 7A, the top panel 16 is sealably retained on the side panels 14 with a plurality of quick release latches 76 for easy and quick installation and removal of the top panel. The top panel 16 also includes a pressure release valve 78 in fluid communication with the internal volume 18 to allow for positive or negative pressure relief relative to the ambient pressure. In one embodiment, the pressure release valve 78 is configured to allow for a one PSI pressure differential, although other valves configured for larger or smaller pressure differentials can be used in alternate embodiments. The one PSI pressure differential is sufficient to allow for easy removal of the top panel 16 if the pressure inside the container assembly 10 is lower than the exterior pressure. The one PSI pressure differential is also small enough that if the pressure in the internal volume 18 is greater than the exterior pressure, the top panel 16 will not energetically remove itself from the side panels 14 when the latches 76 are released.

Figure 9:
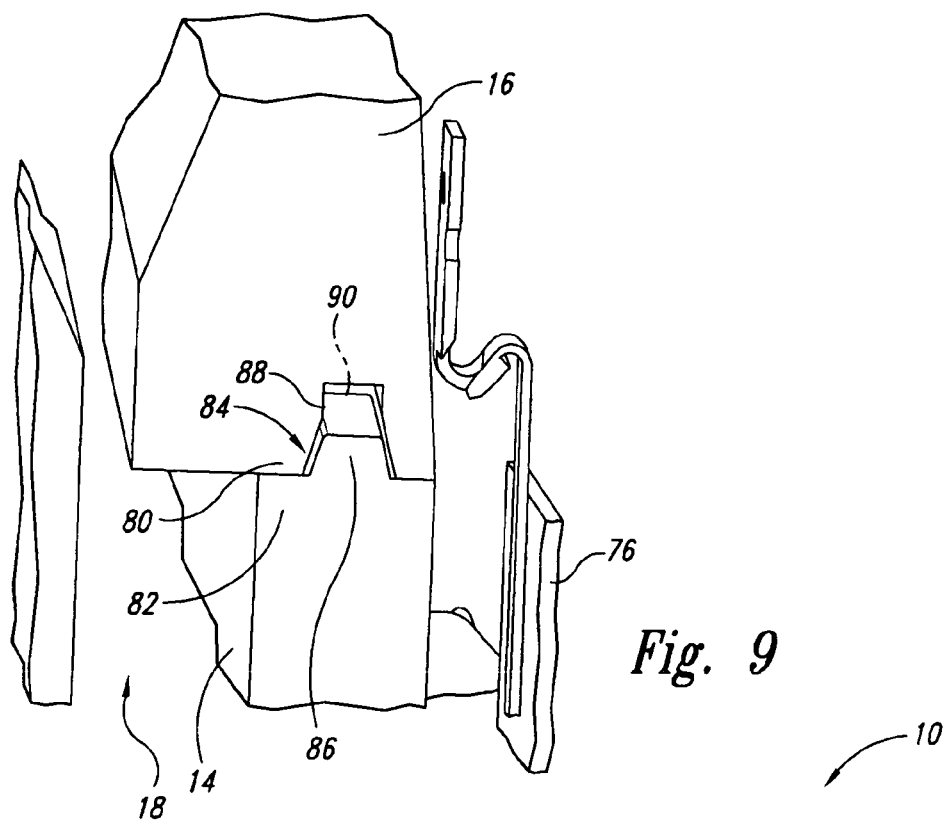
FIG. 9 is an enlarged cross-sectional view taken substantially along line 9-9 of FIG. 7A showing representative joinery between a top panel and a side panel.

The top panel 16 of the illustrated embodiment is a molded member having a plurality of molded hand-holds 79 positioned to allow a person to grasp the top panel and position it on or off the side panels 14. The hand-holds 79 also allow a person to firmly grab the top panel 16 when moving or reconfiguring the container assembly 10. The top panel 16 has a generally concave shape and a peripheral edge 80 that sealably mates with the top edge portion 82 of the side panels 14. The concave shape allows for integral storage areas to be provided in the top panel 16. In the illustrated embodiment, the joint between the peripheral edge 80 of the top panel 16 and the top edge portion 82 of the side panels 14 is a tongue-and-groove joint, although other joinery can be used. FIG. 9 is an enlarged cross-sectional view taken substantially along line 9-9 of FIG. 7 showing the tongue-and-groove joinery 84 between the top panel 16 and one of the side panels 14. The illustrated joinery 84 is illustrative of the joinery between the top panel 16 and all of the side panels 14. The top edge portion 82 of the side panels 14 has a tongue portion 86 projecting upwardly that mates with an elongated groove portion 88 formed in the peripheral edge 80 of the top panel 16.

In one embodiment, a gasket 90 (shown in phantom lines) is provided in the groove portion 88 to sealably engage the tongue portion 86 when the top panel 16 is installed onto the side panels 14. The gasket 90 provides a fluid-tight seal in the tongue-and-groove joinery 84 that prevents the passage of debris, dust, water, fuel, or other fluids into the internal volume 18 of the container assembly 10. In the illustrated embodiment, the gasket 90 is made of a flexible, resilient 60 Durometer silicone material that can vent at 8 PSI if immediate venting is required that exceeds the capacity of the pressure release valve 78 (FIG. 7A) discussed above. While the illustrated embodiment utilizes the tongue-and-groove joinery 84, other suitable joinery can be used in alternate embodiments to provide fluid-tight seals between the top panel 16 and side panels 14.

Figure 10:
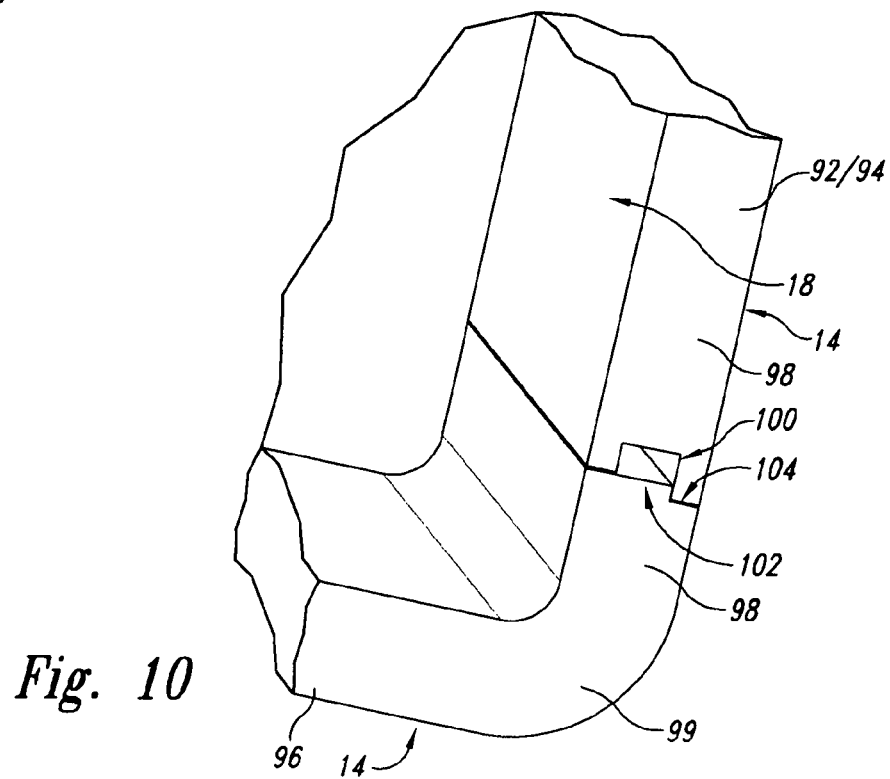
FIG. 10 is an enlarged cross-sectional view taken substantially along line 10-10 of FIG. 7A showing representative joinery between adjacent side panels.

Referring again to FIG. 7A, when the container assembly 10 is in the cargo configuration, the side panels 14 are in the upright, closed position and are connected along vertical mating edges 98. In the illustrated embodiment, the side panels 14 include interchangeable left and right side panels 92 and 94 that mate with opposing, interchangeable end panels 96. The left and right side panels 92 and 94 are substantially planar panels, and the end panels 96 have wrap-around corners 99 that align with the left and right side panels 92 and 94. FIG. 10 is an enlarged cross-sectional view taken substantially along line 10-10 of FIG. 7A showing the joint between adjacent side panels 14. The mating edges 98 of the left or right side panels 92 or 94 include a first joinery portion 100 that releasably and sealably mates with a mating joinery portion 102 of the end panel 96 to define fluid-tight side panel joint 104. The side panel joinery 104 of the illustrated embodiment is a nested, butt-joint configuration, other joint configurations can be used in alternate embodiments.

The end panels 96 releasably lock with the left and right side panels 92 and 94 with a quick-release fastener 124 integrally connected to the end panels 96. The fasteners 124 are recessed below the external surface of the side panels 14. The fasteners 124 releasably engage the left or right side panel 92 and 94. The fasteners 124 allow for the fast and efficient engagement and disengagement of the side panels 14 without requiring extra tools to reconfigure the container assembly 10. Although quick-release fasteners 124 are used in the illustrated embodiment, other suitable fasteners can be used in alternate embodiments.

Figure 12:
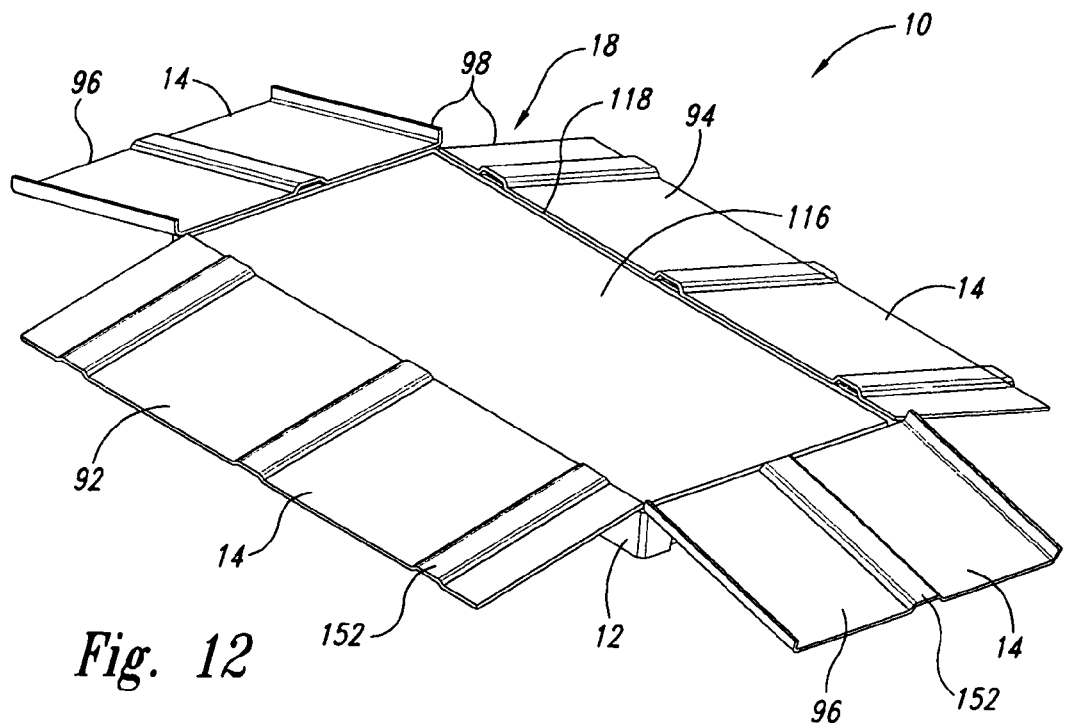
FIG. 12 is a reduced isometric view of the container assembly of FIG. 7A showing the container assembly with all the side panels 14 in a lowered, open position.

The side panel joinery 104 allows each of the side panels 14 to independently move between the upright, closed position as shown in FIG. 7A to a lowered, open position as shown in FIG. 12. When a side panel 14 is in the lowered, open position, the bottom edge of the side panel remains engaged with the base panel 12, such that the lowered side panel defines a loading ramp into the internal volume 18. If a side panel 14 is not needed to form the loading ramp, the side panel can be removed completely from the base panel 12.

Figure 11:
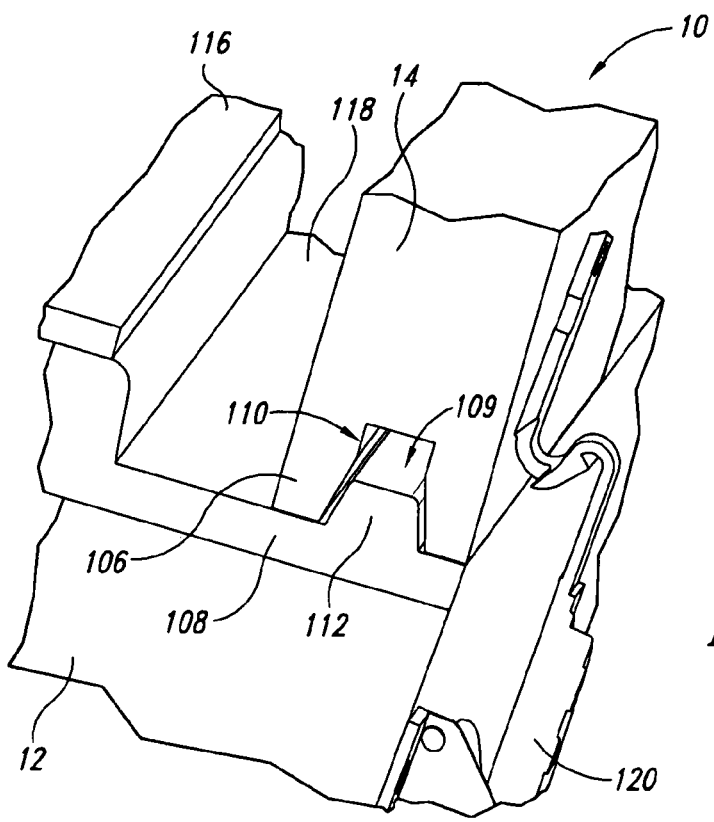
FIG. 11 is an enlarged cross-sectional view taken substantially along line 11-11 of FIG. 7A showing representative joinery between a side panel and the base panel.

FIG. 11 is an enlarged cross-sectional view taken substantially along line 11-11 of FIG. 7A showing representative joinery between the side panels 14 and the base panel 12. The side panels 14 mate along a bottom edge 106 with a peripheral edge 108 of the base panel 12 with tongue-and-groove joinery 109. The bottom edge 106 of the side panel 14 includes an elongated groove portion 110 that releasably mates with a tongue portion 112 projecting from the peripheral edge 108 of the base panel 12. In the illustrated embodiment, the groove portion 110 in the bottom of the side panel 14 has substantially the same shape and size as the groove portion 88 in the top panel (FIG. 9). Similarly, the tongue portion 112 on the base panel's peripheral edge 108 is substantially the same shape and size as the tongue portion 86 on the top of a side panel 14 (FIG. 9).

The base panel 12 includes latches 120 that releasably engage receiving portions 122 integrally formed in the side panels 14 so as to releasably retain the side panels 14 in the upright, closed position. The latches 120 are released when the side panels 14 are moved to the lowered, open position or removed from the base panel 12. The tongue-and-groove joinery 109 between the side panels 14 and the base panel 12 allows for the hinging action about which the side panels can pivot when they move between the upright, closed position and the lowered, open position.

As best seen in FIG. 12, the base panel 12 of the illustrated embodiment includes a floorboard 116 removably retained in a concave molded body portion 118. The floorboard 116 provides a flat and stable surface on which cargo or other items can be supported. The molded concave body portion 118 allows for some storage therein, and the floorboard 116 provides a false floor over molded storage areas in the molded body portion. In one embodiment, the molded storage area under the floorboard is filled with a closed-cell foam or other buoyant material. This material under the floorboard 116 not only adds to the overall buoyancy of the container assembly 10, it also provides support and stability to the floor board when under load.

The floorboard 116 of the illustrated embodiment is a flat, rigid member sealably connected to the body portion 118 that can be easily removed and used for other purposes. The side panels 14 are also versatile structures suitable for uses other than as side panels of a container assembly. For example, in one embodiment the floorboard 116 or a side panel 14 can be used as a stretcher-type structure for use in field operations. The floorboard 116 and side panels 14 can also be radioluscent, such that x-rays can be taken through the structure of a patient when used as a stretcher-like structure. The floorboard 116 can also be nested together with other floorboards to form a hard floor structure removable from the container assembly 10. The floorboards 116 are also interchangeable so that a floorboard can be easily and quickly replaced in the event it is damaged or otherwise not usable with a selected container assembly 10.

Figure 13:
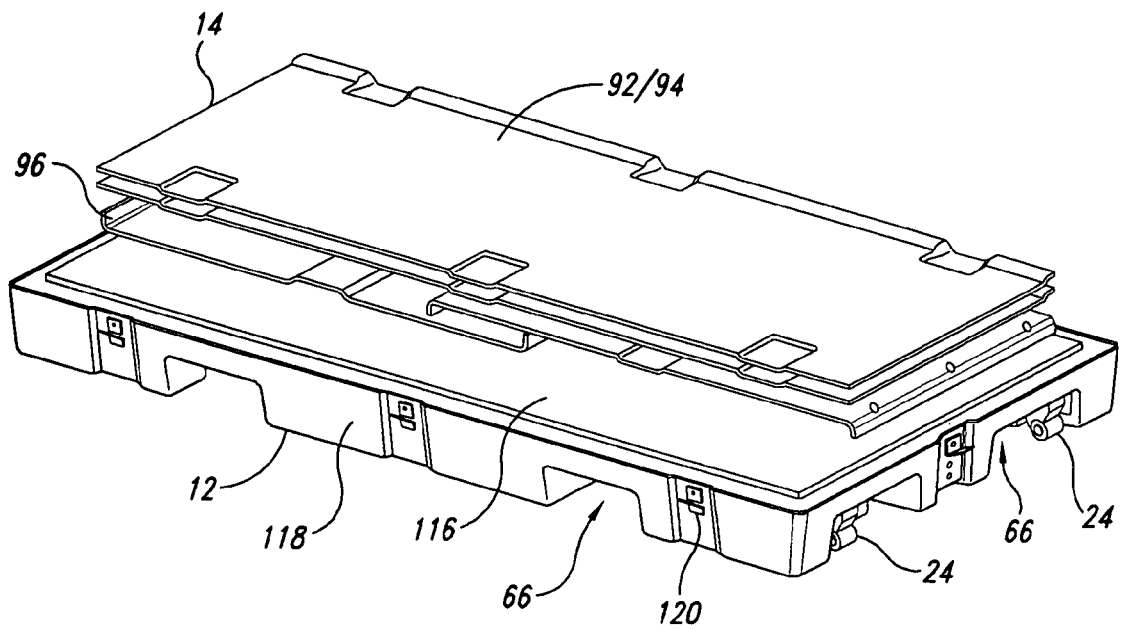
FIG. 13 is an isometric view of the container assembly of FIG. 7A in a collapsed configuration with the side panels in a stacked position on the base panel, and the top panel not shown for purposes of illustration.
Figure 14:
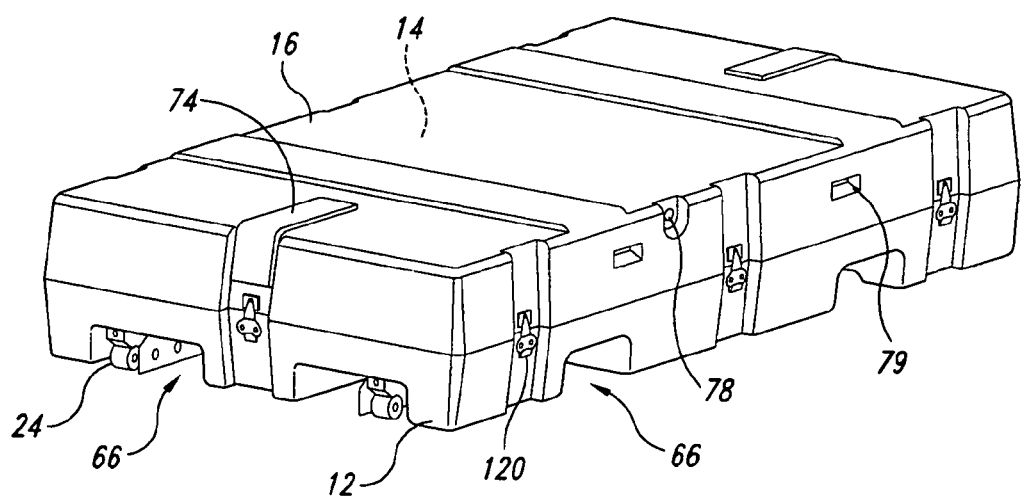
FIG. 14 is an isometric view of the container assembly of FIG. 7A shown in the collapsed configuration with the top panel attached directly to the base panel.

As best seen in FIG. 13, the side panels 14 are sized so that when removed from the base panel 12 as the container assembly 10 is reconfigured into the collapsed configuration they will fit on the floorboard 116 and fully within the peripheral edge 108 of the base panel. As best seen in FIG. 14, the top panel 16 can then be placed directly onto the base panel 12 with the side panels 14 fully contained between them. The configuration of the tongue-and-groove joinery between the side panels 14 and the top and base panels 16 and 12 discussed above is such that the top panel sealably mates directly with the base panel when the container assembly is in the collapsed position. In the illustrated embodiment, the volume of the container assembly 10 in the collapsed configuration is such that several collapsed container assemblies can be stacked within the same volume of a single container assembly when in the cargo configuration. This collapsed configuration allows for efficient use of space when the container assemblies 10 are not in use and are to be stored or transported in the collapsed position.

Figure 15:
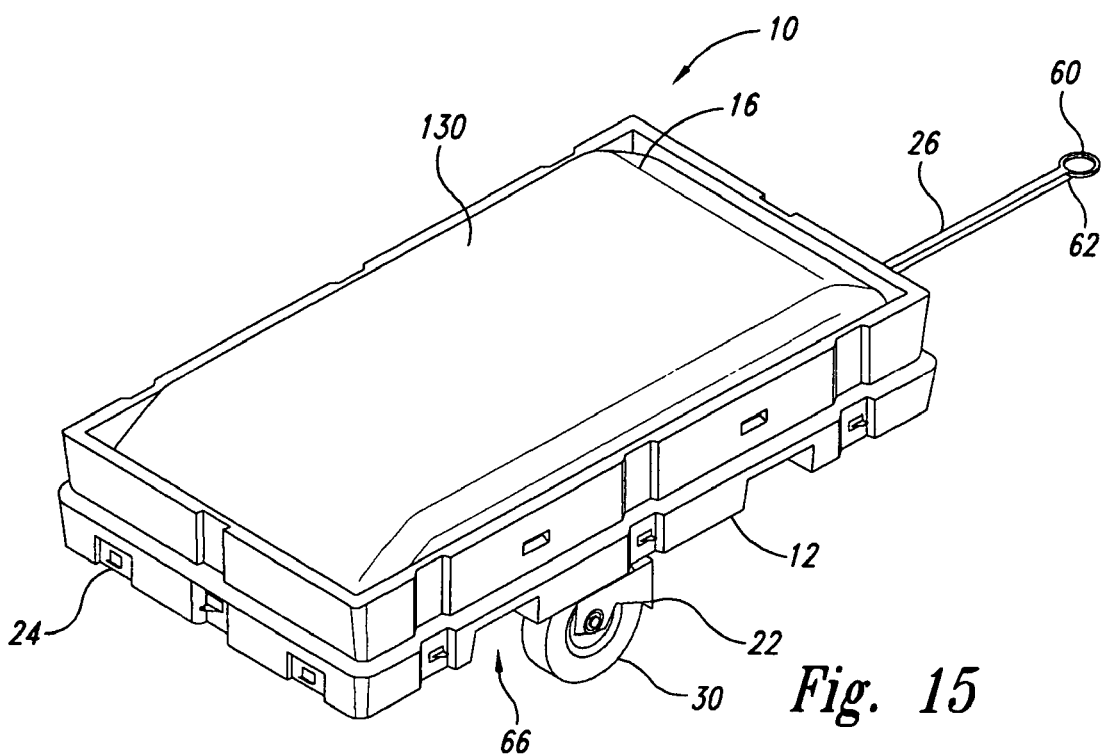
FIG. 15 is an isometric view of the container assembly of FIG. 1 shown in a reconfigured condition to define a fluid transport vehicle that includes a fluid-tight bladder supported in an inverted top panel.

The container assembly 10 of the illustrated embodiment is reconfigurable between the cargo configuration, the collapsed position, and a variety of other multifunctional configurations different than a cargo configuration. In one example, the container assembly 10 can be reconfigured into a water or fluid transport configuration, referred to as a water buffalo configuration. FIG. 15 is an isometric view of the container assembly 10 in the water-buffalo configuration in which the top panel 16 is in an inverted position and placed on the base panel 12. The inverted top panel 16 defines a generally concave area that retains a fluid-tight bladder 130. In one embodiment, the bladder 130 can be integrally connected to the top panel 16 and retained in position when empty and when the container assembly 10 is in the cargo configuration. In an alternate embodiment, the bladder 130 can be removed from the top panel 16 and stored in the container assembly 10 or elsewhere as needed for subsequent use when the container assembly is in the water buffalo configuration. The bladder 130 is configured to hold a substantial amount of water or other selected fluid that is heavy and could be awkward to transport. The base panel 12 has the wheel assemblies 22 in the deployed position and the tow bar 26 attached to provide a towable structure for easy movement of the fluid-filled bladder 130.

Figure 16:
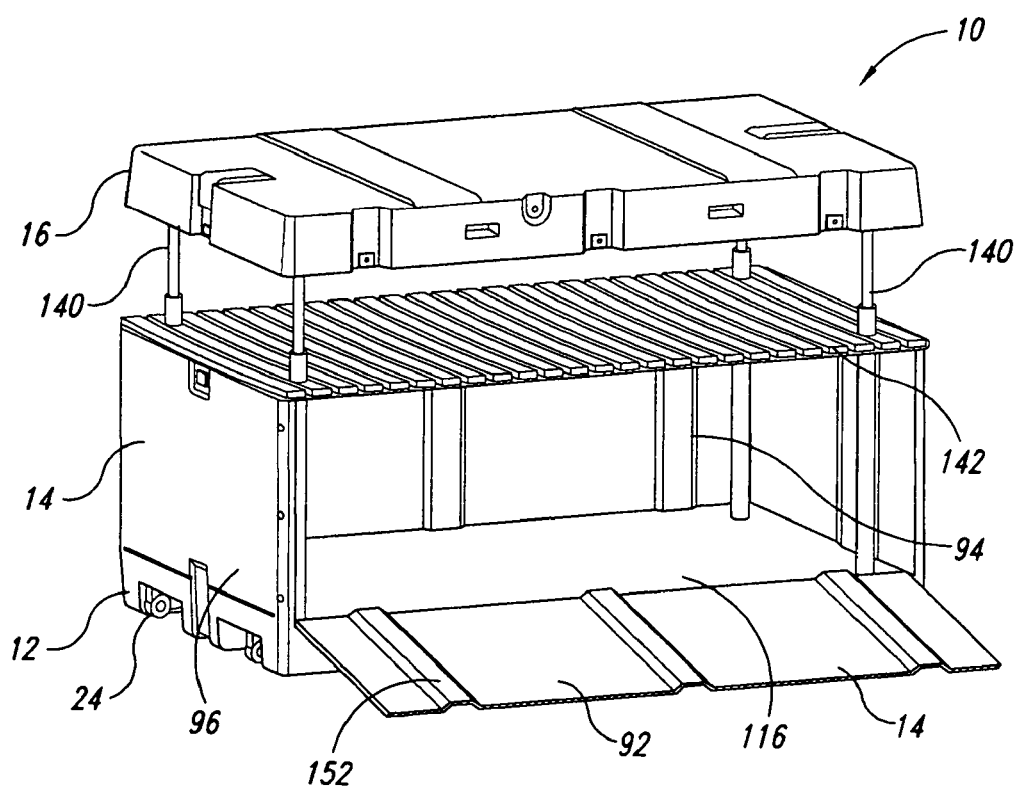
FIG. 16 is an isometric view of the container assembly of FIG. 1 reconfigured in a stationary sleeping cot configuration.

The container assembly 10 can also be reconfigured into a substantially stationary personnel station. As best seen in FIG. 16, the container assembly 10 in one embodiment can be reconfigured into a sleep cot configuration. The sleeping cot configuration includes a plurality of telescoping supports 140 releasably attached to the corner areas of the base panel 12 and the top panel 16. The telescoping supports 140 hold the top panel 16 above the top edges of the side panels 14. A sleeping cot 142, such as a lightweight mesh cot, is releasably attached to the upper edges of the side panels 14 so the sleeping cot spans between the side panels. The top panel 16 positioned over the sleeping cot 142 helps provide some shelter to a person supported by the sleeping cot 142. In the illustrated sleeping cot configuration, one of the side panels 14 is positioned in the lowered, open position to allow for easy access into the sleeping cot 142 and to the area below the sleeping cot, which could be used for storage of selected items. The container assembly 10 can be quickly reconfigured from the sleeping cot configuration back into the cargo configuration without requiring tools by removing the sleeping cot 142 and the telescoping supports 140 and repositioning the side and top panels 14 and 16. The components of the sleeping cot configuration can then be stored and transported with the entire container assembly 10 as a unit.

Figure 17:
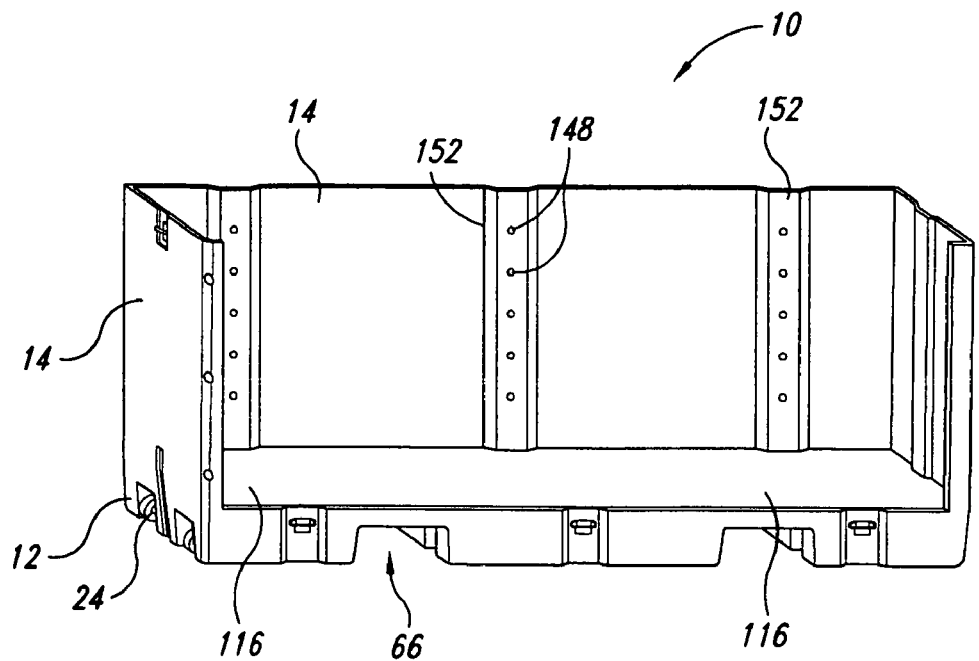
FIG. 17 is an isometric view of the container assembly of FIG. 7 with the top panel removed and one of the side panels removed showing the internal volume of the container assembly.

As best seen in FIG. 17, the side panels 14 have a plurality of threaded receptacles 148 integrally connected to support ribs 152. The receptacles 148 are vertically distributed along each support rib 152 and configured to releasably receive mating threaded fasteners. In one embodiment, the mating fasteners are thumbscrew bolts or other bolts that can be finger tightened in the selected receptacle 148. Alternate embodiments can use other fasteners, including quick release fasteners that fit into corresponding receptacles in the side panels 14. These mating fasteners can be provided on a wide variety of components used in other configurations of the container assembly 10, so that no tools are required to reconfigure the container assembly. The fastener receptacles 148 can also be used with cargo tie-downs to securely retain cargo in place within the container assembly 10 when it is in the cargo configuration.

Figure 18:
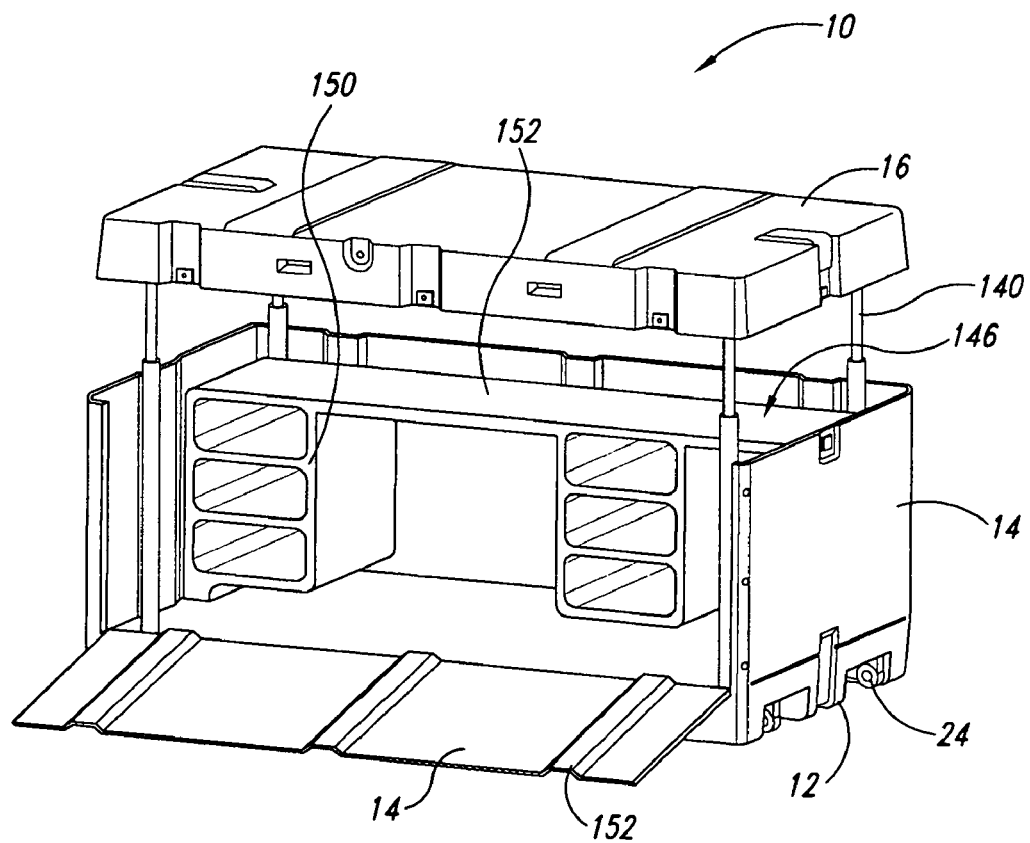
FIG. 18 is an isometric view of the container assembly of FIG. 1 reconfigured into a personnel work station configuration.

As best seen in FIG. 18, the container assembly 10 can also be reconfigured into a personnel workstation configuration. In this personnel workstation configuration, the plurality of telescoping supports 140 support the top panel 16 above the side panels 14, and a desk insert 146 is releasably fastened to the side panels 14. The desk insert 146 can be a single unit that includes a plurality of storage compartments 150 and an elongated desktop 152. In an alternate embodiment, the plurality of storage compartments 150 can be separate units installed and releasably secured to the side panels 14, and the desktop 152 can be mounted on top of the storage compartments so as to define a personnel workstation.

In the illustrated embodiment, one of the side panels 14 is positioned in the lowered, open position to provide easy access into the container assembly 10. The floorboard 116 provides a support area for a chair or the like that a person can use when sitting and working at the workstation. The raised top panel 16 provides some shelter over the desktop 152. The components of the personnel workstation configuration can be removed and fully contained as cargo in the container assembly 10 when reconfigured back into the cargo configuration. Although the illustrated embodiment provides a specific desk insert and storage area insert, other configurations can be used in alternate embodiments to form a personnel workstation with components that releasably attach to the side panels 14, base panel 12, and/or floorboard 116 and can be fully contained in the container assembly 10 when reconfigured into the cargo configuration.

Figure 19:
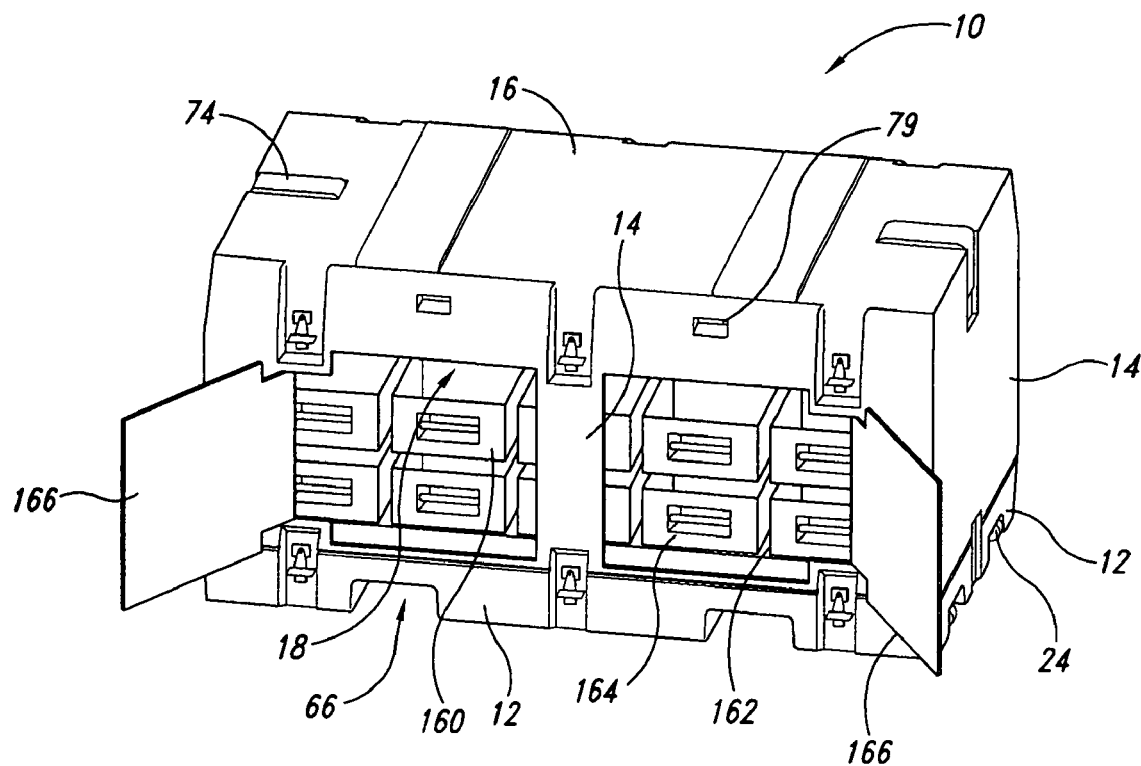
FIG. 19 is an isometric view of the container assembly of FIG. 1 in a storage configuration with a side panel 14 having access doors and a plurality of shelves contained in the internal volume.

As best seen in FIG. 19, the container assembly 10 can be configured into a storage configuration that includes a drawer assembly 160 removably contained within the internal volume 18. The drawer assembly 160 of the illustrated embodiment includes a frame 162 and a plurality of drawers 164 that can be inserted and removed from the internal volume 18. In the illustrated embodiment, the container assembly 10 has a side panel 14 with integral access doors 166 that provide access into the container's internal volume 18 when in an open position. The access doors 166 can be closed and locked so as to securely retain the drawers 164 in place. In one embodiment, the side panel 14 and/or the access doors 166 can be provided with gaskets around the access doors to provide fluid-tight seals around the doorways when the access doors are in the closed position so as to maintain a fluid-tight container assembly 10. In an alternate embodiment, the side panel 14 can be a unitary side panel as discussed above and illustrated in the previous figures such that access to the shelving can be provided by moving one of the side panels to the lowered, open position and exposing the internal volume 18.

In an alternate embodiment, the container assembly 10 can include a plurality of dividers that connect to the side panels 14 or the base panel 16. The dividers act to separate the internal volume 18 into a plurality of sections for selected storage. Alternate embodiments can include a plurality of horizontal or vertical dividers spanning between the sidewalls.

Figure 20:
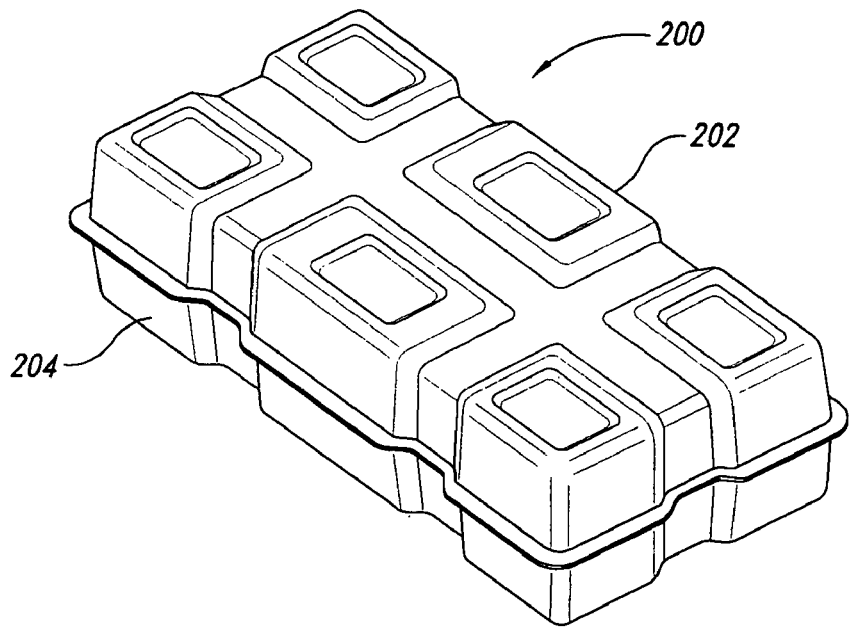
FIG. 20 is an isometric view of a molded, stackable storage container sized to fit into the container assembly of FIG. 1.
Figure 21:
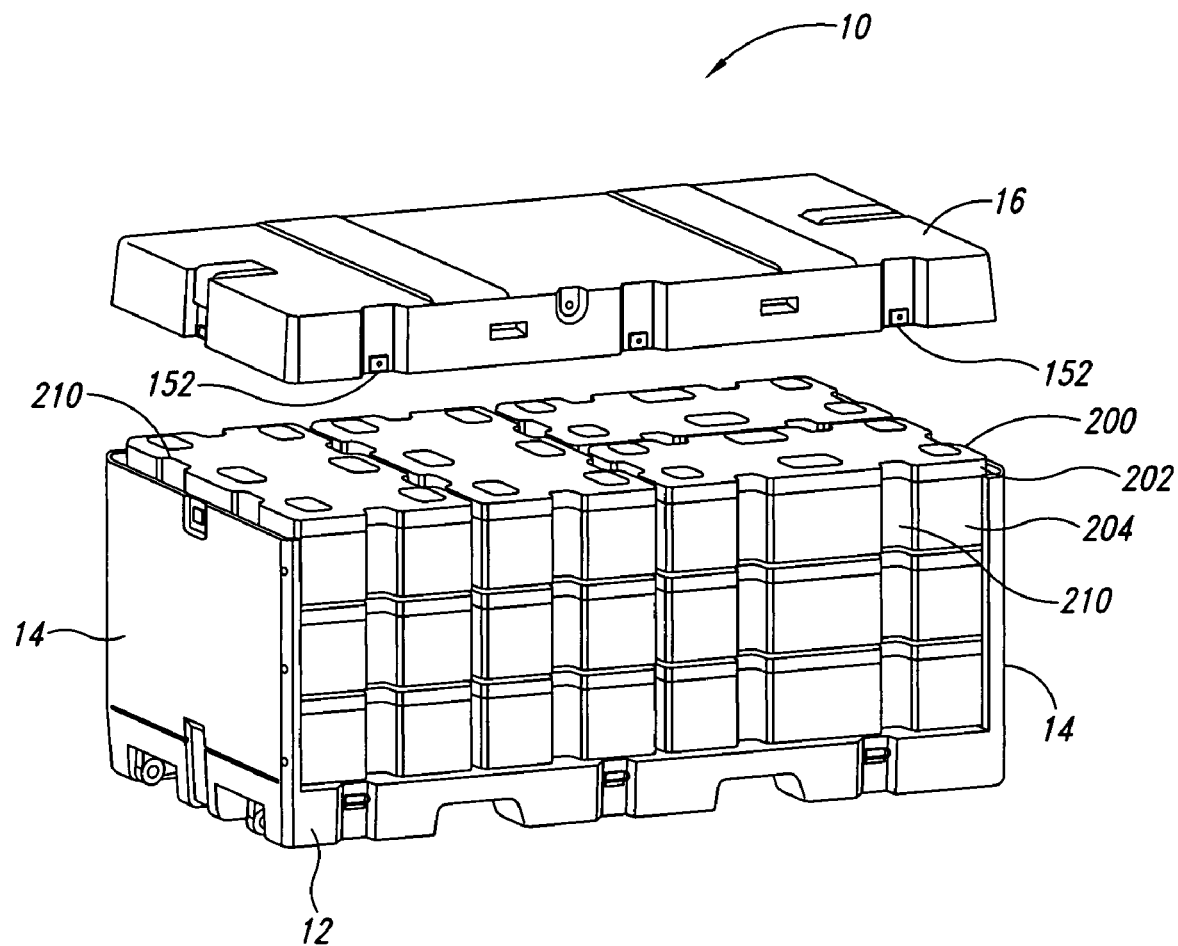
FIG. 21 is a partially exploded isometric view of the container assembly of FIG. 7A with a plurality of the storage containers of FIG. 20 in the interior area.

FIG. 20 is an isometric view of a molded, stackable storage container 200 having a top 202 that removably fits onto a base 204. The storage container 200 has nesting features on the top 202 and base 204 that allow the storage containers to be stacked upon each other. As best seen in FIG. 21, the storage containers 200 are shaped and sized to stack within the internal volume 18 of the container assembly 10 (FIG. 1) when in the cargo configuration. In the illustrated embodiment, the storage container is shaped and sized so that twelve storage containers can stack within and substantially occupy the entire internal volume 18 of the container assembly 10 (FIG. 1). The ends and sides of the storage containers 200 have a plurality of recessed alignment portions 210 sized and positioned to receive the support ribs 152 in the container's side panels 14 and the top panel 16. The alignment portions 210 mate with the support ribs 152 to hold the storage containers in a selected position in the container assemblies interior area to prevent excess movement of the storage containers 200 during transportation. Alternate embodiments of the storage containers 200 can have different dimensions while still being stackable within the container assembly's internal volume 18 when in the cargo configuration.

Although several configurations of the container assembly 10 are described above and shown in the Figures, multiple other configurations different than the cargo configuration can be provided with integral structures and devices that can be contained within the container assembly 10 for selected uses. The container assembly 10, as an example, can be configured into a shower configuration or a personnel decontamination configuration. Therefore, the reconfigurable container assembly 10 provides a very versatile assembly that can be reconfigured into multiple multifunctional configurations for different uses in addition to the cargo configuration.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A reconfigurable, transportable container assembly, comprising:
    a base panel having joinery;
    a lift assembly attached to the base panel and being movable relative to the base panel between a retracted position and an extended position;
    a plurality of releasably interconnected side panels attached to the base panel when the side panels are in an installed closed position to define an internal volume, the side panels having first and second panel joinery, the first panel joinery releasably mates with the base joinery;
    a top panel removably attached to the side panels when the side panels are in the installed, closed position, the top panel having integral top joinery that releasably mates with the second panel joinery, the top panel being combined with the side panels and the base panel to form a first configuration defining a closed, transportable, collapsible container and being reconfigurable to a second configuration defining a substantially stationary structure different from the first configuration;
    wherein first and second panel joinery sealably mate with the base and top joinery, respectively, forming pressure-ventable fluid-tight seals therebetween, and the side panels each have side joinery that sealably mates with the side joinery of adjacent side panels forming pressure-ventable fluid-tight seals therebetween; and
    wheel assemblies attached to the base panel and being movable between a stored position and a deployed position, the wheel assemblies being configured to rollably support the transportable container assembly when in the deployed position.

2. The assembly of claim 1 further comprising a fluid-tight bladder connected to one of the top panel and base panel.

3. The assembly of claim 2 wherein the base panel is shaped to receive the top panel in an inverted position when the side panels are removed from the base panel, the bladder is positioned atop the top panel when in the inverted position.

4. The assembly of claim 1 wherein the base joinery is configured to mate with the top joinery of the top panel when the container is in a collapsed position with the side panels removed from the top and base joinery.

5. The assembly of claim 4 wherein the side panels are sized to be fully contained between the top and base panels when the container is in the collapsed position.

6. The assembly of claim 4 wherein the top and base joinery form a substantially fluid-tight seal between the top and base panels when the container is in the collapsed position.

7. The assembly of claim 1, further comprising a plurality of supports contained in the container assembly when the container is in the first configuration and connected to the top panel to support the top panel at a position above and spaced apart from the side panels when the container assembly is in the second configuration.

8. The assembly of claim 1, further comprising a personnel support structure sized to be contained in the container assembly in the first configuration and being positionable relative to the side panels to define a support assembly that supports a person above the base panel when the container assembly is in the second configuration.

9. The assembly of claim 1 wherein the lift assembly further comprises first and second extended positions supporting the base panel a respective first and second selected distances away from a support surface.

10. The assembly of claim 9 wherein the lift assembly further comprises a caster portion adjacent to a distal end thereof, the caster portion positioned to engage the support surface when the lift assembly is in the first extended position, and the caster portion positioned to disengage the support surface when the lift assembly is in the second extended position.

11. The assembly of claim 1 further comprising a pressure release valve in fluid communication with the internal volume.

12. The assembly of claim 1 wherein the lift assembly is sized to support the base panel a selected distance away from a support surface when the lift assembly is in the extended position that allows the wheel assemblies to be moved between the stored and deployed positions without substantial interference by the support surface.

13. The assembly of claim 12 wherein the base panel has a bottom surface and a recessed area adjacent to the bottom surface, the lift assembly is substantially fully contained in the recessed area when the lift assembly is in the retracted position, and a leg portion of the lift assembly projects past the bottom surface and engages the support surface when the lift assembly is in the extended position.

14. The assembly of claim 1 wherein the base panel has a bottom surface and recessed areas adjacent to the bottom surface, the wheel assemblies are substantially fully contained in the recessed areas when the wheel assemblies are in the stored position, and the wheel assemblies project past the bottom surface when the wheel assemblies are in the deployed position.

15. The assembly of claim 1 wherein the base panel has a bottom surface and first and second recessed areas adjacent to the bottom surface, the lift assembly is substantially fully contained in the first recessed area when the lift assembly is in the retracted position, and the lift assembly projects past the bottom surface when the lift assembly is in the extended position, and the wheel assemblies are substantially fully contained in the second recessed areas when the wheel assemblies are in the stored position, and the wheel assemblies project past the bottom surface when the wheel assemblies are in the deployed position.

16. The assembly of claim 1 wherein the lift assembly is movable between the retracted position, a first extended position, and a second extended position, the lift assembly being configured to support the base panel a selected distance above a support surface when the lift assembly is in the first and second extended positions, and configured to be substantially out of engagement with the support surface when in the retracted position, the lift assembly includes a support leg portion and a caster assembly, the caster assembly being positioned to movably engage the support surface when the lift assembly is in the first extended position.

17. The assembly of claim 16 wherein the support leg portion of the lift assembly has a free end portion, and the caster assembly is out of rolling engagement with the support surface while the support leg portion engages the support surface when the lift assembly is in the second extended position.

18. The assembly of claim 1 wherein the base panel has a concave body portion and a floorboard removably connected to the body portion, the body portion shaped to define a storage area below the floorboard.

19. The assembly of claim 1 wherein the base panel has a plurality of channels formed therein and sized to receive tines of a fork lift assembly, the lift assembly and wheel assembly being spaced apart from the plurality of channels when in the retracted and stored positions, respectively.

20. The assembly of claim 1, further comprising a tow member removably attachable to the base panel and configured to releasably attach to the tow vehicle, the tow member being storable in at least one of the internal volume, the base panel and the top panel.

21. The assembly of claim 1 wherein the side panels include a pair of opposing, interchangeable end panels and a pair of interchangeable left and right panels extending between the end panels.

22. The assembly of claim 1, further comprising a plurality of seals at interconnections between adjoining side panels and at interconnections between the side panels and the top and base panels.

23. A collapsible container assembly, comprising:
a base panel;
interchangeable side panels removably attached to the base panel, the side panels interconnected with each other and form a substantially fluid-tight seal with the base panel when the side panels are in a substantially upright, closed position, the side panels and base panels defining an internal volume when the side panels are in the closed position, at least one of the side panels being movable between the closed position and a lowered, open position with a bottom edge of the respective side panel being in engagement with the base panel when in the first, lowered position to form a ramp for access into the internal volume of the container assembly;
a top panel removably attached to the side panels and forming a substantially fluid-tight seal when the side panels are in the closed position, the top panel being combined with the side panels and the base panel to form a buoyant and collapsible container assembly;
wherein the base panel is configured to mate with the top panel defining a smaller second internal volume and forming a substantially fluid-tight seal therebetween when the container assembly is in a collapsed position with the side panels removed from the top and base panels;
retractable wheel assemblies attached to the base panel and being movable between a stored position and a deployed position; and
a tow member removably attachable to the base panel and configured to releasably attach to a tow vehicle, the tow member being storable in at least one of the internal volume, the base panel and the top panel.

24. The assembly of claim 23 wherein the base panel has a bottom surface and recessed areas adjacent to the bottom surface, the wheel assemblies are substantially fully contained in the recessed areas when the wheel assemblies are in the stored position, and the wheel assemblies project past the bottom surface when the wheel assemblies are in the deployed position.

25. The assembly of claim 23 wherein the tow member is a telescopic tow bar movable between a collapsed position for storage and an extended position for connecting to the tow vehicle.

26. The assembly of claim 23, further comprising a fluid-tight bladder connectable to one of the top panel or the base panel.

27. The assembly of claim 26 wherein the base panel is shaped to receive the top panel in an inverted position when the side panels are removed, and the bladder is positionable atop the top panel when in the inverted position.

28. The assembly of claim 26 wherein the top panel in the inverted position defines a concave receptacle, and the bladder is retained in the concave receptacle.

29. The assembly of claim 23, further comprising a retractable lift assembly attached to the base panel and being movable between a retracted position and an extended position.

30. The assembly of claim 29 wherein the lift assembly supports the base panel a selected distance from a support surface when the lift assembly is in the extended position that allows the wheel assemblies to be moved between the stored position and the deployed position substantially without interference by the support surface.

31. The assembly of claim 29 wherein the lift assembly is an adjustable jack.

32. The assembly of claim 29 wherein the base panel has a bottom surface and a recessed area adjacent to the bottom surface, the lift assembly is substantially fully contained in the recessed area when the lift assembly is in the retracted position, and the lift assembly projects past the bottom surface when the lift assembly is in the extended position.

33. The assembly of claim 23 wherein the side panels are sized to be fully contained between the top and base panels when removed and the container assembly is in the collapsed position.

34. The assembly of claim 23 wherein the side, base, and top panels define a first configuration when all the side panels are in the closed position between the base and the top panels, and the container assembly is reconfigurable to a second configuration defining a stationary structure different than the first configuration.

35. A reconfigurable transport container assembly, comprising:
a base panel having base joinery;
a retractable lift assembly integrally attached to the base panel and movable between a retracted position and an extended position;
retractable wheel assemblies integrally attached to the base panel movable between a stored position and a deployed position and being configured to rollably support the container assembly for towing by a tow vehicle when the wheel assemblies are in a deployed position;
a tow member releasably attached to the base panel and positioned to releasably engage the tow vehicle when the wheel assemblies are in the deployed position;
a plurality of side panels removably attached to each other and to the base panel to define an internal volume;
a top panel having top joinery and being removably attached to a plurality of side panels when the side panels are in an installed closed position to form a first configuration defining a transportable container assembly and being reconfigurable to a second configuration defining a substantially stationary structure different from the first configuration; and wherein each of the plurality of side panel further comprises base and top joinery that sealably mate with the base and top joinery of the base and top panels, respectively, forming pressure-ventable fluid-tight seals therebetween, and each of the plurality of side panels each have side joinery that sealably mates with the side joinery of adjacent side panels forming pressure-ventable fluid-tight seals therebetween.

36. The assembly of claim 35 further comprising a fluid-tight bladder connected to one of the top panel and base panel.

37. The assembly of claim 35 wherein the top panel, base panel, and side panels form a substantially fluid-tight and buoyant transportable container when the assembly is in the first configuration.

38. A transportable container assembly, comprising:
a substantially rigid molded base panel having a concave body portion and a floorboard removably connected to the body portion, the body portion shaped to define a storage area below the floorboard;
a pair of substantially rigid molded end panels and a pair of substantially rigid molded side panels alternately removably attached to each other and to the base panel to define an internal volume, each of the end and side panels being independently movable relative to the base panel from a substantially upright, closed position to a lowered, open position to provide access to the internal volume;
a substantially rigid molded top panel removably attached to the end and side panels to cover the internal volume when the end and side panels are in the closed position, the top panel being combined with the end and side panels and the base panel to form a transportable, collapsible container;
when the end and side panels are in the closed position, releasable and sealable mating joinery portions of the end panels forming pressure-ventable substantially fluid-tight side panel joints with the respective adjacent side panels;
when the end and side panels are in the closed position, first tongue-and-groove joinery formed between the base panel and each of the end and side panels, and second tongue-and-groove joinery formed between the top panel and each of the end and side panels, each of the first and second tongue-and-groove joinery forming pressure-ventable substantially fluid-tight seal there between;
retractable lift assemblies recessed in the base panel and being movable between a retracted position, a first extended position and a second extended position, each lift assembly having a rotatable leg assembly, a jack assembly between the base panel and the leg portion, and a caster portion, the lift assemblies being configured to support the base panel above a support surface when the lift assemblies are in each of the first and second extended positions and to be substantially out of engagement with the support surface when in the retracted position, each caster assembly positioned to movably engage the support surface when the respective lift assembly is in the first extended position, the caster assembly being out of engagement with the support surface and the leg portion being in engagement with the support surface when the respective lift assembly is in the second extended position;
a pair of retractable wheel assemblies attached to the base panel adjacent to a center portion thereof and being movable between a stored position and a deployed position; and
a pressure release valve in fluid communication with the internal volume, the pressure release valve being structured to substantially equalize pressure differentials relative to ambient pressure.

39. The assembly of claim 38 wherein the side panels further comprise substantially planar panels and the end panels further comprise wrap-around corners that align and mate with the respective side panels.

40. The assembly of claim 38, further comprising a tow bar positioned to extend from a first end of the base panel and further comprising an eyelet adjacent to an end thereof distal from the first end of the base panel when extended therefrom, and a second opposite end of the base panel further comprising a trailering attachment having a coupler structured to connect to the eyelet adjacent to the distal end of the tow bar of an other container assembly.

41. The assembly of claim 38 wherein the top and base panels are configured to engage each other when the assembly is in a collapsed position with the side panels removed.

42. The assembly of claim 38 wherein the end and side panels are independently movable between the closed and open positions, each end and side panel being substantially rigid and configurable to engage the base panel to form a loading ramp for access to the internal volume when the respective panel is in the open position.

43. The assembly of claim 38 further comprising a fluid-tight bladder connected to one of the top panel and base panel.

44. The assembly of claim 43 wherein the base panel is shaped to receive the top panel in an inverted position when the side panels are removed, and the bladder is positioned atop the top panel when in the inverted position.

45. The assembly of claim 41, further comprising third tongue-and-groove joinery between the top panel and the base panel when the side panels are removed, the tongue-and-groove joinery forming a substantially fluid-tight seal.

46. The assembly of claim 38 wherein the pressure release valve is further structured to substantially equalize a pressure differential of approximately one pound per square inch (PSI).

47. The assembly of claim 38 wherein the lift assembly supports the base panel a selected distance from a support surface when the lift assembly is in the second extended position that allows the wheel assemblies to be moved between the stored position and the deployed position without interference by the support surface.

48. The assembly of claim 38 wherein the base panel has a bottom surface and a recessed area adjacent to the bottom surface, the lift assembly is substantially fully contained in the recessed area when the lift assembly is in the retracted position, and the lift assembly projects past the bottom surface when the lift assembly is in the first and second extended positions.

49. The assembly of claim 38 wherein the pressure release valve is further structured to substantially equalize positive and negative pressure differentials relative to ambient pressure.

* * * * *